United States Patent
Murdoch et al.

(10) Patent No.: US 12,021,868 B2
(45) Date of Patent: Jun. 25, 2024

(54) SECURING AUTHENTICATION FLOWS USING A DECENTRALIZED IDENTIFIER

(71) Applicant: Microsoft Technology Licensing, LLC, Redmond, WA (US)

(72) Inventors: Brandon Brian Murdoch, Reading (GB); Daniel Godbout, Kirkland, WA (US); Michael Blair Jones, Redmond, WA (US); Kristina Yasuda, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 17/710,220

(22) Filed: Mar. 31, 2022

(65) Prior Publication Data
US 2023/0319039 A1    Oct. 5, 2023

(51) Int. Cl.
*H04L 29/06* (2006.01)
*H04L 9/32* (2006.01)
*H04L 9/40* (2022.01)
*H04L 9/00* (2022.01)
*H04L 9/38* (2006.01)

(52) U.S. Cl.
CPC ........ *H04L 63/0884* (2013.01); *H04L 9/3247* (2013.01); *H04L 9/38* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 10,685,099 B2 * | 6/2020 | Chen | .................. | H04L 63/0815 |
| 10,924,284 B2 * | 2/2021 | Yang | .................. | H04L 63/0876 |
| 11,714,894 B2 * | 8/2023 | Sorensen | .............. | H04L 9/3247 726/7 |
| 11,769,577 B1 * | 9/2023 | Dods | ..................... | G16H 20/10 705/50 |

(Continued)

FOREIGN PATENT DOCUMENTS

WO    2022016280 A1    1/2022

OTHER PUBLICATIONS

"International Search Report and Written Opinion Issued in PCT Application No. PCT/US23/012966", dated May 31, 2023, 12 Pages.

*Primary Examiner* — Maung T Lwin
(74) *Attorney, Agent, or Firm* — Workman Nydegger

(57) ABSTRACT

A digital wallet generates an identification value associated with a DID of a DID owner. The digital wallet generates a first request including the identification value for an authentication token from an identification provider. The first request is provided to the identification provider. The digital wallet receives, in response to the identification provider validating the first request, the authentication token that authenticates the digital wallet with a verifiable claim issuer including the identification value from the identification provider. The digital wallet generates a second request for one or more verifiable claims from the verifiable claim issuer. The second request includes the DID and authentication token including the identification value. In response to the verifiable claim issuer validating the authentication token and the identification value, one or more verifiable claims from the verifiable claim issuer are received by the digital wallet.

20 Claims, 12 Drawing Sheets

(56) References Cited

U.S. PATENT DOCUMENTS

| | | | |
|---|---|---|---|
| 2019/0130391 A1* | 5/2019 | Wright | G06Q 20/065 |
| 2021/0287285 A1* | 9/2021 | Yan | H04L 9/3239 |
| 2021/0288974 A1 | 9/2021 | Murdoch et al. | |
| 2021/0385216 A1 | 12/2021 | Khalil et al. | |
| 2023/0132505 A1* | 5/2023 | Lee | H04L 9/3239 |
| | | | 713/156 |

* cited by examiner

SECURING AUTHENTICATION FLOWS USING A DECENTRALIZED IDENTIFIER

BACKGROUND

A digital identity is a mechanism to keep track of an entity across different digital contexts. After an identity is determined, appropriate action can be taken related to the entity that has the identity. As an example, authorizations, privileges, customizations, and access can be provided to the entity. Thus, digital identities are an important mechanism to ensure that information is restricted to appropriate trust boundaries via appropriate containment of authorizations and privileges. Digital identities are also an important mechanism to ensure a positive and consistent user experience when accessing their data and customizations.

Most currently used documents or records that prove identity are issued by centralized organizations, such as governments, corporations, schools, employers, or other service centers or regulatory organizations. These organizations often maintain every member's identity in a centralized identity management system. A centralized identity management system is a centralized information system used for organizations to manage the issued identities, their authentication, authorization, roles, and privileges. Centralized identity management systems have been deemed as secure since they often use professionally maintained hardware and software. Typically, the identity issuing organization sets the terms and requirements for registering people with the organization. When a party needs to verify another party's identity, the verifying party often needs to go through the centralized identity management system to obtain information verifying and/or authenticating the other party's identity.

Decentralized Identifiers (DIDs) are a more recent type of identifier. Decentralized identifiers are independent of any centralized registry, identity provider, or certificate authority. Distributed ledger technology (such as blockchain) provides the opportunity for using fully decentralized identifiers. Distributed ledger technology uses distributed ledgers to record transactions between two or more parties in a verifiable way. Once a transaction is recorded, the data in the section of ledger cannot be altered retroactively without the alteration of all subsequent sections of ledger. This provides a fairly secure platform in which it is difficult or impossible to tamper with data recorded in the distributed ledger. Since a DID is generally not controlled by a centralized management system, but rather is owned by an owner of the DID, DIDs are sometimes referred to as identities without authority.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Computing technologies provide for a data structure called a "verifiable claim or credential". In these technologies, a verifiable claim issuer makes one or more claims about a subject and generates the verifiable claim. The verifiable claim includes those claim(s) as well as proof instructions to prove that claim(s) have not been tampered with and were indeed issued by the verifiable claim issuer. The verifiable claim also often includes duration information metadata that defines a period of time that the verifiable claim is valid for use or that defines a specific number of times that the verifiable claim is authorized for use. In a decentralized environment, the verifiable claim also includes a Decentralized Identifier (DID) of the verifiable claim issuer. The verifiable then provides the verifiable claim to a claims holder (i.e., the subject of the claim made in the verifiable claim), for presentation to any relying party that relies upon the veracity of those claims.

As an example, the verifiable claim issuer might be a computing system associated with a government agency in charge of issuing driver licenses. The government agency computing system may generate a verifiable claim with claims about a citizen, such as the birthdate, residence address, weight, eye color, hair color, authorization to drive, restrictions on authorization to drive, and so forth. The government agency computing system issues the verifiable claim to the citizen. If the citizen is stopped by law enforcement, a computing system of the citizen may present the verifiable claim, whereby a computing system associated with law enforcement may use the proof instructions to verify that the claims were issued by the government agency and indeed have not been tampered with since issuance. In another example, a computing system of an organization that provides inoculations may issue claims to a parent of a child that assert that the child has received certain inoculations. The computing system of the parent may then present these inoculation claims to a school where the child is to attend. In the above examples, the relying party was the law enforcement agency and the school the child attends or more specifically, the computing system of the law enforcement agency and the school.

To obtain a verifiable claim from a verifiable claim issuer, the subject of a claim often makes a request to the verifiable claim issuer to obtain a verifiable claim that can later be presented to a relying party. For example, a citizen may request that the government agency provide him or her a verifiable claim related to the driver's license, or the parent may request the organization that provides the inoculations provide him or her with a verifiable claim related to their child's inoculation history. In response to the request, the verifiable claim issuer will provide the verifiable claim to the subject of the claim once any procedures related to the issuance of the verifiable claim have been satisfied.

In many instances, however, the verifiable claim issuer may not be sure that the entity that makes a request for a verifiable claim is actually the subject of the claim. For example, it is possible that a malicious party may try to obtain verifiable claims related to the subject of the claim so as to pass off the verifiable claims as his or her own verifiable claims. For instance, a parent who does not believe in inoculations may spoof a request to the organization that provides inoculations so as to pretend to be the claim subject. In this way, the parent who does not believe in the inoculations may receive a verifiable claim intended for the child of the claim subject and then pass this claim off for their own child. Thus, the school would believe the child of the malicious parent was inoculated when in fact he or she may not be.

The embodiments presented herein provide a novel solution to the above discussed problem. The embodiments presented herein utilize a DID of a DID owner who desires to request one or more verifiable claims from a verifiable claim issuer. A digital wallet owned by the DID owner generates an identification value that binds the identification value to the DID of the DID owner. The identification value may be a nonce value or randomized hash value that is signed using the private key, a hash of the DID, or even the DID itself.

The embodiments presented herein also utilize an identity provider. The identity provider is an entity that is configured to provide authentication and validation for the verifiable claim issuer of entities that wish to receive one or more verifiable claims from the verifiable claim issuer. Thus, the identity provider is a trusted source from the perspective of the verifiable claim issuer and the verifiable claim issuer is able to rely on an authentication and validation performed by the identity provider.

In the embodiments disclosed herein, the digital wallet generates the identification value. The digital wallet then sends a request to the identity provider for an authentication token so that the digital wallet can receive one or more verifiable claims from the verifiable claim issuer. The identification value is included in the request for the authentication token.

Upon receipt of the request for the authentication token, the identity provider authenticates or validates the request is such a way that the identity provider is able to ascertain that the owner of the digital wallet is an entity that is trusted to receive services from the verifiable claim issuer. The identity provider then generates an authentication token and includes the identification value in the authentication token. However, the identity provider does not decrypt or otherwise interpret the identification value, but merely includes the identification value in the authentication token. The authentication token is then returned to the digital wallet.

The digital wallet generates a request for one or more verifiable claims and includes the authentication token and the DID in the request. The request is then sent to the verifiable claim issuer. Upon receipt of the request, the verifiable claim issuer authenticates or validates the authentication token to ascertain that the owner of the digital wallet is authorized to receive verifiable claims from the verifiable claim issuer. In addition, the verifiable claim issuer uses the DID to validate the identification value. Thus, the embodiments disclosed herein bind the authentication proofs generated by the identity provider to the DID of the DID owner requesting the verifiable claims. This provides a high level of security and allows the verifiable claim issuer to have a high level of trust that the party that requested the verifiable claims that will be bound to the DID is the actual subject of the verifiable claims.

In one embodiment, a digital wallet generates an identification value. The digital wallet generates a first request including the identification value for an authentication token from an identification provider. The first request is provided to the identification provider. The digital wallet receives from the identification provider, in response to the identification provider validating the first request, the authentication token that authenticates the digital wallet with a verifiable claim issuer including the identification value. The digital wallet generates a second request for one or more verifiable claims from the verifiable claim issuer. The second request includes the DID and authentication token including the identification value. In response to the verifiable claim issuer validating the authentication token and the identification value, one or more verifiable claims from the verifiable claim issuer are received by the digital wallet.

In an embodiment, the identification value is a random number or hash value that is signed using the private key. In an embodiment, the identification value is a hash of the DID. In an embodiment, the identification value is the DID. In an embodiment, the public key is accessible by accessing a DID document associated with the DID that is tied to the distributed ledger. In av embodiment, the first request includes identification information related to the DID owner such as a username, password, and information requesting the authentication token. In an embodiment, the authentication token includes one or more authentication proofs that are generated by the identity provider. In an embodiment, the authentication token is cryptographically signed by the identity provider.

In the embodiment, the second request includes information specifying one or more verifiable claims that the DID owner desires to receive from the verifiable claim issuer. In the embodiment, the second request is cryptographically signed using the same private key as was used to generate the identification value. In the embodiment, the one or more verifiable claims received from the verifiable claim issuer are stored at the digital wallet and/or in an identity hub.

In one embodiment, an identity provider receives an authentication request for an authentication token from a digital wallet that is associated with a DID of a DID owner. The authentication token authenticates the digital wallet with a verifiable claim issuer. The authentication request includes an identification value associated with the DID that was generated by the digital wallet. The authentication request is validated. In response to validating the authentication request, the identity provider generates the authentication token including the identification value and provides the authentication token to the digital wallet.

In an embodiment, the authentication request includes identification information related to the DID owner and information requesting the authentication token. In an embodiment, the authentication token includes one or more authentication proofs that are generated by the identity provider. In an embodiment, the identity provider cryptographically signs the authentication token. In an embodiment, the identity provider includes the identification value with the authentication token without decrypting the identification value.

In one embodiment, a verifiable claim issuer receives a request for one or more verifiable claims from a digital wallet that is associated with a DID of a DID owner. The request includes the DID and an authentication token generated by an identity provider. The authentication token includes an identification value that was generated by the digital wallet and that is bound to the DID. The verifiable claim issuer uses the DID to access a public key that is associated with the private key via a distributed ledger. The verifiable claim issuer validates the authentication token to ensure that the identity provider issued the authentication token. The verifiable claim issuer validates the identification value. In response to validating the authentication token and the identification value, the verifiable claim issuer provides one or more verifiable claims to the digital wallet.

In the embodiment, the identification value is validated using a public key that is associated with a private key associated with the DID. In an embodiment, the identification value is validated by comparing a hash of the DID received in the request with a hash of the DID. In an embodiment, the identification value is validated by comparing the DID received in the request with the DID.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Figure 1:
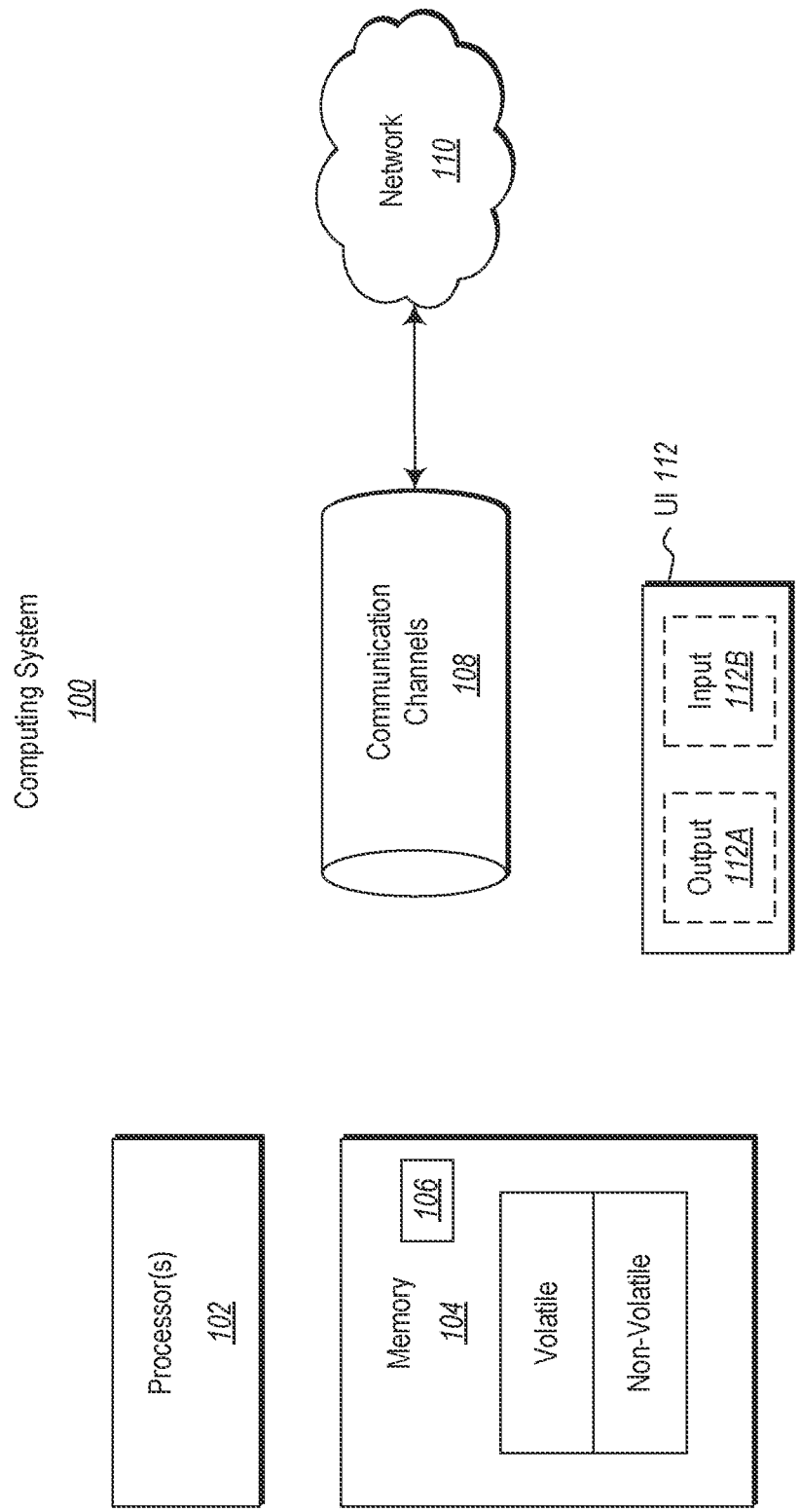
FIG. 1 illustrates an example computing system in which the principles described herein may be employed.

In one embodiment, a digital wallet generates an identification associated with a DID of a DID owner. The digital wallet generates a first request including the identification value for an authentication token from an identification provider. The first request is provided to the identification provider. The digital wallet receives from the identification provider, in response to the identification provider validating the first request, the authentication token that authenticates the digital wallet with a verifiable claim issuer including the identification value. The digital wallet generates a second request for one or more verifiable claims from the verifiable claim issuer. The second request includes the DID and authentication token including the identification value. In response to the verifiable claim issuer validating the authentication token and the identification value, one or more verifiable claims from the verifiable claim issuer are received by the digital wallet.

In one embodiment, an identity provider receives an authentication request for an authentication token from a digital wallet that is associated with a DID of a DID owner. The authentication token authenticates the digital wallet with a verifiable claim issuer. The authentication request includes an identification value associated with the DID that was generated by the digital wallet. The authentication request is validated. In response to validating the authentication request, the identity provider generates the authentication token including the identification value and provides the authentication token to the digital wallet.

In one embodiment, a verifiable claim issuer receives a request for one or more verifiable claims from a digital wallet that is associated with a DID of a DID owner. The request includes the DID and an authentication token generated by an identity provider. The authentication token includes an identification value that was generated by the digital wallet and that is bound to the DID. The verifiable claim issuer validates the authentication token to ensure that the identity provider issued the authentication token. The verifiable claim issuer validates the identification value. In response to validating the authentication token and the identification value, the verifiable claim issuer provides one or more verifiable claims to the digital wallet.

Because the principles described herein are performed in the context of a computing system, some introductory discussion of a computing system will be described with respect to FIG. 1. Then, this description will return to the principles of the embodiments disclosed herein with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that are executed by a processor. The memory takes any form and depends on the nature and form of the computing system. A computing system is distributed over a network environment and includes multiple constituent computing systems.

As illustrated in FIG. 1, in its most basic configuration, a computing system 100 typically includes at least one hardware processing unit 102 and memory 104. The at least one hardware processing unit 102 includes a general-purpose processor and also includes a field-programmable gate array (FPGA), an application-specific integrated circuit (ASIC), or any other specialized circuit. The memory 104 is physical system memory, which is volatile, non-volatile, or some combination of the two. The term "memory" also be used herein to refer to non-volatile mass storage such as physical storage media. If the computing system is distributed, the processing, memory and/or storage capability is distributed as well.

The computing system 100 also has thereon multiple structures often referred to as an "executable component". For instance, memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component include software objects, routines, methods, and so forth, that is executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure is computer-readable directly by the processors (as is the case if the executable component were binary). Alternatively, the structure is structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions are embodied on one or more computer-readable media that form a computer program product. An example of such an operation involves the manipulation of data. If such acts are implemented exclusively or near-exclusively in hardware, such as within an FPGA or an ASIC, the computer-executable instructions are hardcoded or hard-wired logic gates. The computer-executable instructions (and the manipulated data) are stored in the memory 104 of the computing system 100. Computing system 100 also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Embodiments described herein comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions configure the computing system to perform a certain function or group of functions. The computer executable instructions are, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention is practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. In some cases, the invention also is practiced in distributed system environments where local and remote computing systems, which are linked (either by hardwired data links, wireless data links, or by a combination of hardwired and wireless data links) through a network, both perform tasks. In a distributed system environment, program modules are located in both local and remote memory storage devices.

Those skilled in the art will also appreciate that the invention is practiced in a cloud computing environment. Cloud computing environments are distributed, although this is not required. When distributed, cloud computing environments are distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which corresponds to the computing system 100 previously described. The computing systems of the remaining figures include various components or functional blocks that implement the various embodiments disclosed herein as will be explained. The various components or functional blocks are implemented on a local computing system or are implemented on a distributed computing system that includes elements resident in the cloud or that implement aspects of cloud computing. The various components or functional blocks are implemented as software, hardware, or a combination of software and hardware. The computing systems of the remaining figures include more or less than the components illustrated in the figures and some of the components are combined as circumstances warrant. Although not necessarily illustrated, the various components of the computing systems access and/or utilize a processor and memory, such as the hardware processing unit 102 and memory 104, as needed to perform their various functions.

Figure 2:
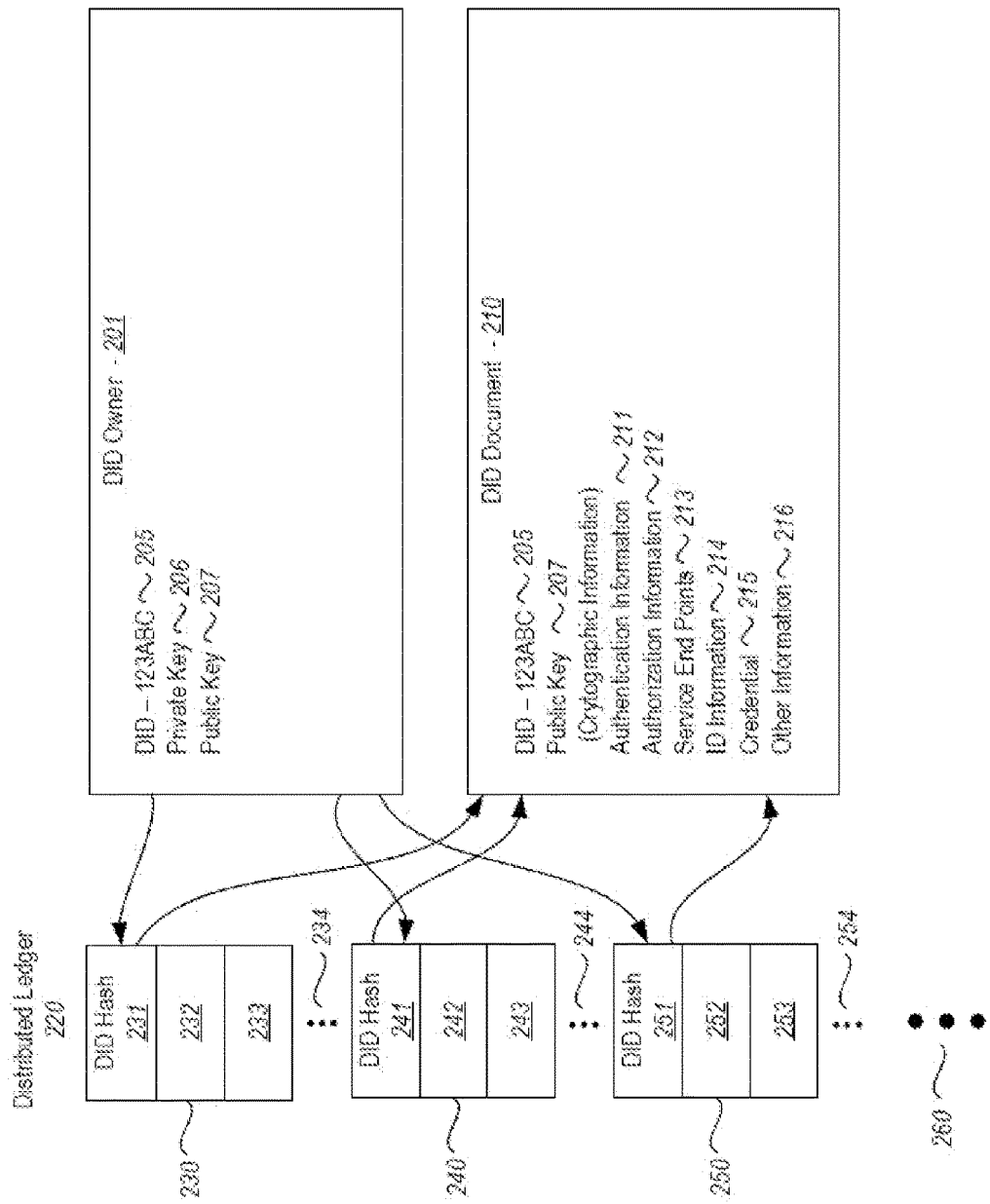
FIG. 2 illustrates an example environment for creating a decentralized identification or identifier (DID)

Some introductory discussions of a decentralized identification (DID) and the environment in which they are created and reside will now be given with respect to FIG. 2, which illustrates a decentralized network 200. As illustrated in FIG. 2, a DID owner 201 owns or controls a DID 205 that represents an identity of the DID owner 201. The DID owner 201 registers a DID using a creation and registration service, which will be explained in more detail below.

The DID owner 201 is any entity that could benefit from a DID. For example, the DID owner 201 is a human being or an organization of human beings. Such organizations might include a company, department, government, agency, or any other organization or group of organizations. Each individual human being might have a DID while the organization(s) to which each belongs might likewise have a DID.

The DID owner 201 alternatively may be a machine, system, or device, or a collection of machine(s), device(s) and/or system(s). In still other embodiments, the DID owner 201 is a subpart of a machine, system, or device. For instance, a device could be a printed circuit board, where the subpart of that circuit board are individual components of the circuit board. In such embodiments, the machine or device has a DID and each subpart also have a DID. A DID owner might also be a software component such as the executable component 106 described above with respect to FIG. 1. An example of a complex executable component 106 might be an artificial intelligence. An artificial intelligence also owns a DID.

Thus, the DID owner 201 is any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 creates and registers the DID 205. The DID 205 is any identifier that is associated with the DID owner 201. Preferably, that identifier is unique to that DID owner 201, at least within a scope in which the DID is anticipated to be in use. As an example, the identifier is a locally unique identifier, and perhaps more desirably a globally unique identifier for identity systems anticipated to operate globally. In some embodiments, the DID 205 is a Uniform Resource Identifier (URI) (such as a Uniform Resource Locator (URL)) or other pointers that relates the DID owner 201 to mechanism to engage in trustable interactions with the DID owner 201.

The DID 205 is "decentralized" because it does not require a centralized, third-party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 is any identifier that is under the control of the DID owner 201 and independent of any centralized authority.

In some embodiments, the structure of the DID 205 is as simple as a username or some other human-understandable term. However, in other embodiments, the DID 205 preferably be a random string of numbers and letters for increased security. In one embodiment, the DID 205 is a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair is generated on a device controlled by the DID owner 201. The private key 206 and public key 207 pairs should not be generated on a server controlled by any centralized authority as this causes the private key 206 and public key 207 pairs to not be fully under the control of the DID owner 201 at all times. Although FIG. 2 and this description have described a private and public key pair, it will also be noted that other types of reasonable cryptographic information and/or mechanism also be used as circumstances warrant.

FIG. 2 also illustrates a DID document 210 that is associated with the DID 205. As will be explained in more detail to follow, the DID document 210 is generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 is implemented according to methods specified by a distributed ledger 220 that will be used to store a representation of the DID 205 as will be explained in more detail to follow. Thus, the DID document 210 has different methods depending on the specific distributed ledger.

The DID document 210 also includes the public key 207 created by the DID owner 201 or some other equivalent cryptographic information. The public key 207 is used by third-party entities that are given permission by the DID owner 201 to access information and data owned by the DID owner 201. The public key 207 may also be used by verifying that the DID owner 201, in fact, owns or controls the DID 205.

The DID document 210 also includes authentication information 211. The authentication information 211 specify one or more mechanisms by which the DID owner 201 is able to prove that the DID owner 201 owns the DID 205. In other words, the mechanisms of authentication information 211 show proof of a binding between the DID 205 (and thus the DID owner 201) and the DID document 210. In one embodiment, the authentication information 211 specifies that the public key 207 be used in a signature operation to prove the ownership of the DID 205. Alternatively, or in addition, the authentication information 211 specifies that the public key 207 be used in a biometric operation to prove ownership of the DID 205. Accordingly, the authentication information 211 includes any number of mechanisms by which the DID owner 201 is able to prove that the DID owner 201 owns the DID 205.

The DID document 210 also includes authorization information 212. The authorization information 212 allows the DID owner 201 to authorize third party entities the rights to modify the DID document 210 or some part of the document without giving the third party the right to prove ownership of the DID 205. For example, the authorization information 212 allows the third party to update any designated set of one or more fields in the DID document 210 using any designated update mechanism. Alternatively, the authorization information allows the third party to limit the usages of DID 205 by the DID owner 201 for a specified time period. This is useful when the DID owner 201 is a minor child and the third party is a parent or guardian of the child. The authorization information 212 allows the parent or guardian to limit the use of the DID 205 until such time as the child is no longer a minor.

The authorization information 212 also specifies one or more mechanisms that the third party will need to follow to prove they are authorized to modify the DID document 210. In some embodiments, this mechanism is similar to those discussed previously with respect to the authentication information 211.

The DID document 210 also includes one or more service endpoints 213. A service endpoint includes a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers are used by the DID owner 201 or by third party entities to access the services that operate on behalf of the DID owner 201. Specific examples of service endpoints 213 will be explained in more detail to follow.

The DID document 210 further includes identification information 214. The identification information 214 includes personally identifiable information such as the name, address, occupation, family members, age, hobbies, interests, or the like of DID owner 201. Accordingly, the identification information 214 listed in the DID document 210 represents a different persona of the DID owner 201 for different purposes. For instance, a persona is pseudo-anonymous, e.g., the DID owner 201 include a pen name in the DID document when identifying him or her as a writer posting articles on a blog; a persona is fully anonymous, e.g., the DID owner 201 only want to disclose his or her job title or other background data (e.g., a school teacher, an FBI agent, an adult older than 21 years old, etc.) but not his or her name in the DID document; and a persona is specific to who the DID owner 201 is as an individual, e.g., the DID owner 201 includes information identifying him or her as a volunteer for a particular charity organization, an employee of a particular corporation, an award winner of a particular award, etc.

The DID document 210 also includes credential information 215, which may also be referred to herein as an attestation. The credential information 215 (also referred to as a verifiable claim) is any information that is associated with the DID owner 201's background. For instance, the credential information 215 is (but not limited to) a qualification, an achievement, a government ID, a government right such as a passport or a driver's license, a digital asset provider or bank account, a university degree or other educational history, employment status and history, or any other information about the DID owner 201's background.

The DID document 210 also includes various other information 216. In some embodiments, the other information 216 includes metadata specifying when the DID document 210 was created and/or when it was last modified. In other embodiments, the other information 216 includes cryptographic proofs of the integrity of the DID document 210. In still further embodiments, the other information 216 includes additional information that is either specified by the specific method implementing the DID document or desired by the DID owner 201.

FIG. 2 also illustrates a distributed ledger or blockchain 220. The distributed ledger 220 is any decentralized, distributed network that includes various computing systems that are in communication with each other. For example, the distributed ledger 220 includes a first distributed computing system 230, a second distributed computing system 240, a third distributed computing system 250, and any number of additional distributed computing systems as illustrated by the ellipses 260. The distributed ledger or blockchain 220 operates according to any known standards or methods for distributed ledgers. Examples of conventional distributed ledgers that correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 is stored on the actual distributed ledger itself. Alternatively, in other embodiments the DID document 210 is stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID has 231, DID has 241, and DID has 251, which are ideally identical copies of the same DID. The DID hash 231, DID hash 241, and DID hash 251 then point to the location of the DID document 210. The distributed ledger or blockchain 220 also store numerous other representations of other DIDs as illustrated by references 232, 233, 234, 242, 243, 244, 252, 253, and 254.

In one embodiment, when the DID owner 201 creates the DID 205 and the associated DID document 210, the DID hash 231, DID hash 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The DID hash 231, DID hash 241, and DID hash 251 includes, in addition to the pointer to the DID document 210, a record or timestamp that specifies when the DID 205 was created. At a later date when modifications are made to the DID document 210, this also is recorded in DID hash 231, DID hash 241, and DID hash 251. The DID hash 231, DID hash 241, and DID hash 251 further includes a copy of the public key 207 so that the DID 205 is cryptographically bound to the DID document 210.

Figure 3:
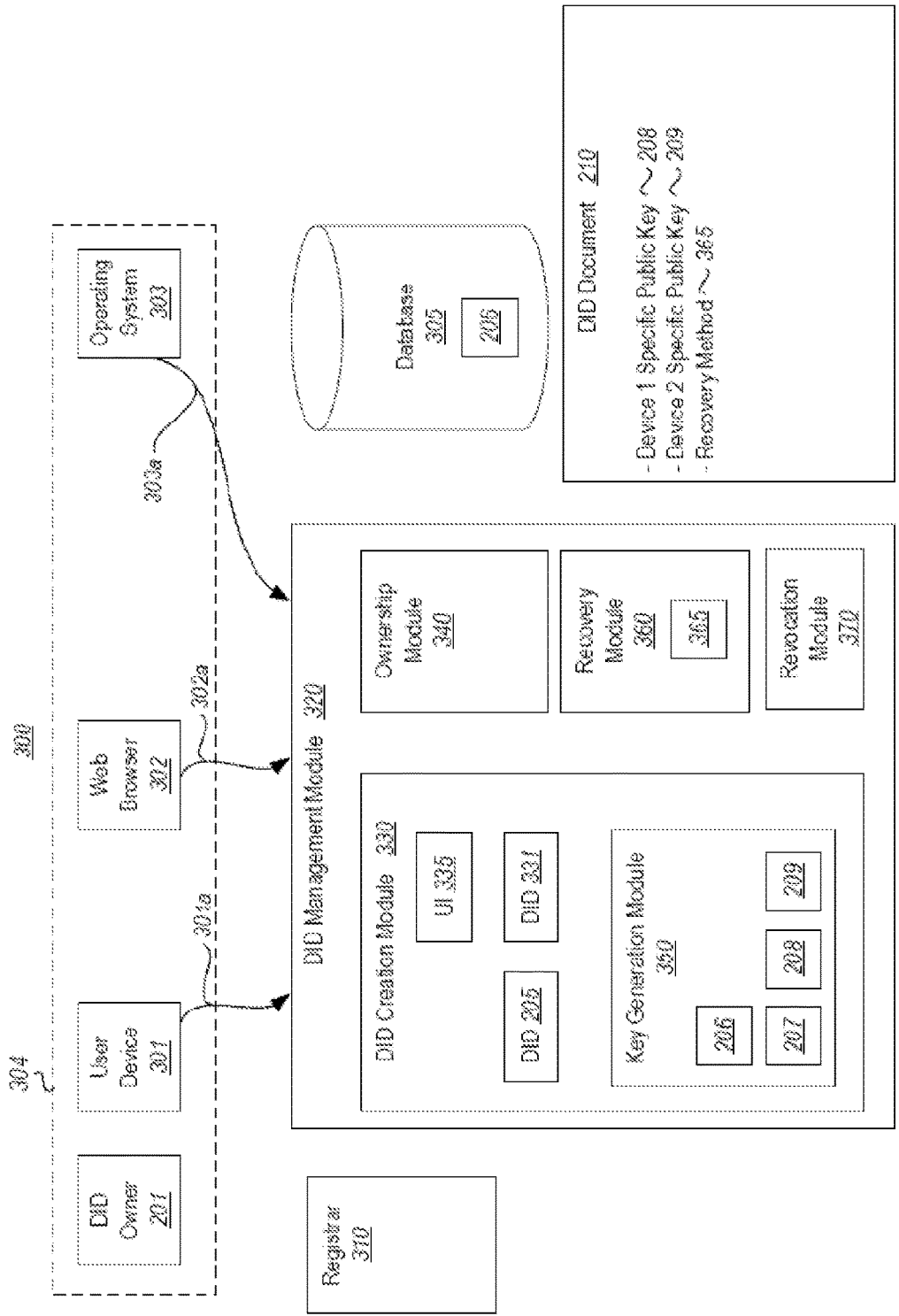
FIG. 3 illustrates an example environment for various DID management operations and services.

Having described DIDs and how they operate generally with reference to FIG. 2, specific embodiments of DID environments will now be explained. Turning to FIG. 3, a computing system environment 300 that is used to perform various DID management operations and services will now be explained. It will be appreciated that the environment of FIG. 3 reference elements from FIG. 2 as needed for ease of explanation.

As shown in FIG. 3, the computing system environment 300 includes various devices and computing systems that are owned or otherwise under the control of the DID owner 201. These include a user device 301. The user device 301 is, but is not limited to, a mobile device such as a smart phone, a computing device such as a laptop computer, or any device such as a car or an appliance that includes computing abilities. The user device 301 includes a web browser 302 operating on the device and an operating system 303 operating the device. More broadly speaking, the dashed line 304 represents that all of these devices are owned or otherwise under the control of the DID owner 201.

The computing system environment 300 also includes a DID management module 320. It will be noted that in operation, the DID management module 320 resides on and is executed by one or more of user device 301, web browser 302, and the operating system 303 as illustrated by respective lines 301a, 302a, and 303a. Accordingly, the DID management module 320 is shown as being separate for ease of explanation. In some embodiments, the DID management module 320 is referred to as a "digital wallet", a "wallet app", or a "user agent". It will be appreciated by one of skill in the art, however, that a digital wallet, wallet app, or user agent can be implemented in a computing system other than the DID management module 320 in other embodiments.

As shown in FIG. 3, the DID management module 320 includes a DID creation module 330. The DID creation module 330 is used by the DID owner 201 to create the DID 205 or any number of additional DIDs, such as DID 331. In one embodiment, the DID creation module includes or otherwise has access to a User Interface (UI) element 335 that guides the DID owner 201 in creating the DID 205. The DID creation module 330 has one or more drivers that are configured to work with specific distributed ledgers such as distributed ledger 220 so that the DID 205 complies with the underlying methods of that distributed ledger.

A specific embodiment will now be described. For example, the UI 335 prompt for the user to enter a username or some other human recognizable name. This name is used as a display name for the DID 205 that will be generated. As previously described, the DID 205 is a long string of random numbers and letters and so having a human-recognizable name for a display name is advantageous. The DID creation module 330 then generates the DID 205. In the embodiments having the UI 335, the DID 205 is shown in a listing of identities and is associated with the human-recognizable name.

The DID creation module 330 also included a key generation module 350. The key generation module generates the private key 206 and public key 207 pair previously described. The DID creation module 330 uses the DID 205 and the private and public key pair to generate the DID document 210. Thus, the DID 205 is signed by the DID owner 201 using the private key 206 when generating the DID and the DID document.

In operation, the DID creation module 330 accesses a registrar 310 that is configured to the specific distributed ledger that will be recording the transactions related to the DID 205. The DID creation module 330 uses the registrar 310 to record DID hash 231, DID hash 241, and DID hash 251 in the distributed ledger in the manner previously described, and to store the DID document 210 in the manner previously described. This process uses the public key 207 in the hash generation.

In some embodiments, the DID management module 320 includes an ownership module 340. The ownership module 340 provides mechanisms that ensure that the DID owner 201 is in sole control of the DID 205. In this way, the provider of the DID management module 320 is able to ensure that the provider does not control the DID 205 but is only providing the management services.

As previously discussed, the key generation module 350 generates the private key 206 and public key 207 pair and the public key 207 is then recorded in the DID document 210. Accordingly, the public key 207 is usable by all devices associated with the DID owner 201 and all third parties that desire to provide services to the DID owner 201. Accordingly, when the DID owner 201 desires to associate a new device with the DID 205, the DID owner 201 executes the DID creation module 330 on the new device. The DID creation module 330 then uses the registrar 310 to update the DID document 210 to reflect that the new device is now associated with the DID 205, which update would be reflected in a transaction on the distributed ledger 220, as previously described.

In some embodiments, however, it is advantageous to have a public key per user device 301 owned by the DID owner 201 as this allows the DID owner 201 to sign with the device-specific public key without having to access a general public key. In other words, since the DID owner 201 will use different devices at different times (for example using a mobile phone in one instance and then using a laptop computer in another instance), it is advantageous to have a key associated with each device to provide efficiencies in signing using the keys. Accordingly, in such embodiments the key generation module 350 generates additional public keys 208 and 209 when the additional devices execute the DID creation module 330. These additional public keys are associated with the private key 206 or in some instances are paired with a new private key.

In those embodiments where the additional public keys 208 and 209 are associated with different devices, the additional public keys 208 and 209 are recorded in the DID document 210 as being associated with those devices. This is shown in FIG. 3. It will be appreciated that the DID document 210 often includes the information (information 205, 207 and 211 through 216) previously described in relation to FIG. 2 in addition to the information (information 208, 209 and 365) shown in FIG. 3. If the DID document 210 existed prior to the device-specific public keys being generated, then the DID document 210 would be updated by the DID creation module 330 via the registrar 310 and this would be reflected in an updated transaction on the distributed ledger 220.

In some embodiments, the DID owner 201 often desires to keep secret the association of a device with a public key or the association of a device with the DID 205. Accordingly, the DID creation module 330 causes that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 generates an additional DID, for example DID 331, for each device. The DID creation module 330 then generates private and public key pairs and DID documents for each of the devices and has them recorded on the distributed ledger 220 in the manner previously described. Such embodiments are advantageous for devices that change ownership as it is possible to associate the device specific DID to the new owner of the device by granting the new owner authorization rights in the DID document and revoking such rights from the old owner.

As mentioned, to ensure that the private key 206 is totally in the control of the DID owner 201, the private key 206 is created on the user device 301, web browser 302, or operating system 303 that is owned or controlled by the DID owner 201 that executed the DID management module 320. In this way, there is little chance that of a third-party (and most consequentially, the provider of the DID management module 320) gaining control of the private key 206.

However, there is a chance that the device storing the private key 206 is lost by the DID owner 201, which causes the DID owner 201 to lose access to the DID 205. Accordingly, in some embodiments, the UI 335 includes the option to allow the DID owner 201 to export the private key 206 to an off device secured database 305 that is under the control of the DID owner 201. As an example, the database 305 is one of the identity hubs 410 described below with respect to FIG. 4. A storage module 380 is configured to store data (such as the private key 206 or the credential information 215 made by or about the DID owner 201) off device in the database 305 or in the identity hubs 410 that will be described in more detail to follow. Of course, in some embodiments the storage module 380 stores at least some data on the device if the device has sufficient storage resources. In some embodiments, the private key 206 is stored as a QR code that is scanned by the DID owner 201.

In other embodiments, the DID management module 320 includes a recovery module 360 that is used to recover a lost private key 206. In operation, the recovery module 360 allows the DID owner 201 to select one or more recovery mechanisms 365 at the time the DID 205 is created that are later used to recover the lost private key. In those embodiments having the UI 335, the UI 335 allows the DID owner 201 to provide information that will be used by the one or more recovery mechanisms 365 during recovery. The recovery module 360 run on any device associated with the DID 205.

The DID management module 320 also included a revocation module 370 that is used to revoke or sever a device from the DID 205. In operation, the revocation module uses the UI 335, which allows the DID owner 201 to indicate a desire to remove a device from being associated with the DID 205. In one embodiment, the revocation module 370 accesses the DID document 210 and causes all references to the device to be removed from the DID document 210. Alternatively, the public key for the device is removed. This change in the DID document 210 is then reflected as an updated transaction on the distributed ledger 220 as previously described.

Figure 4:
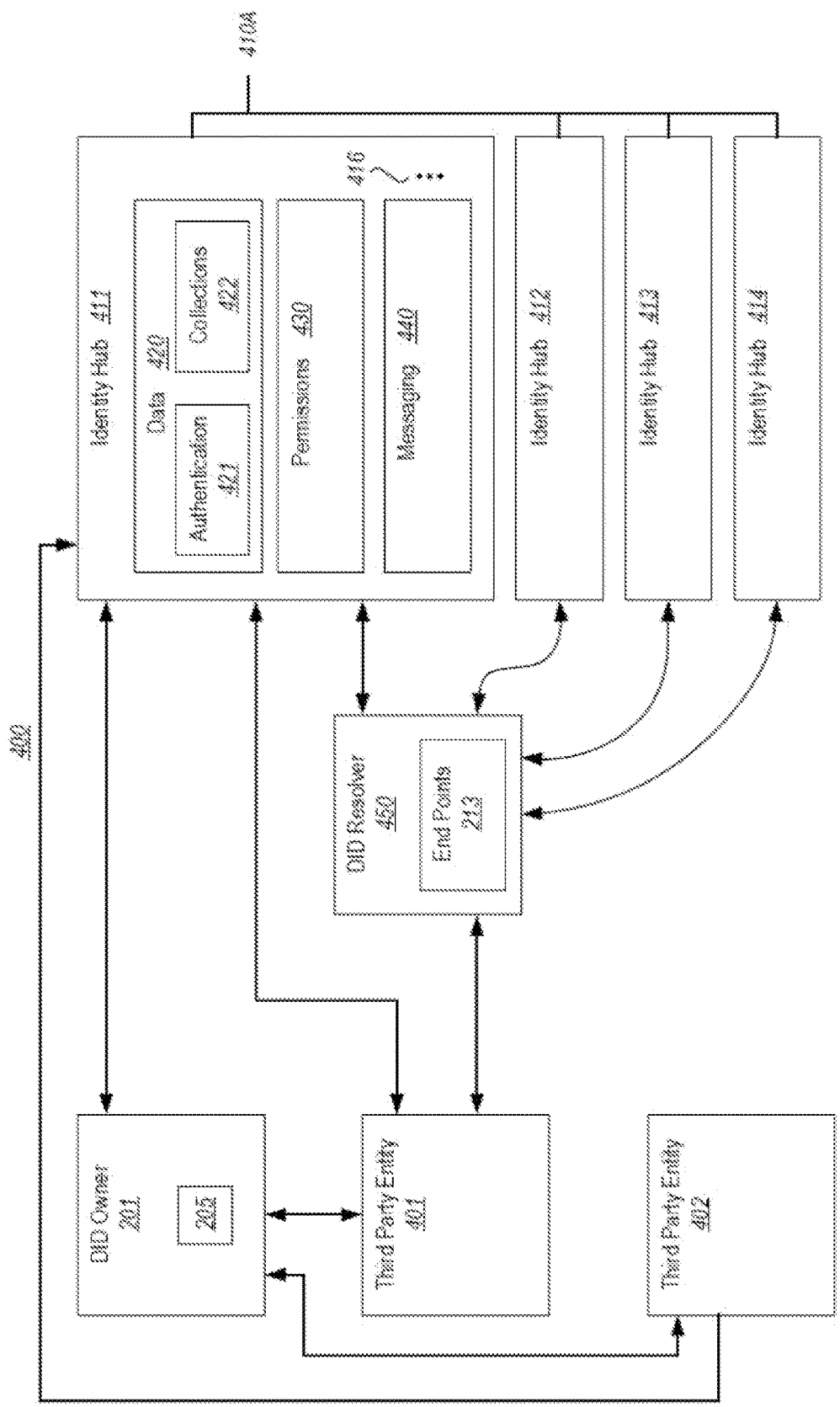
FIG. 4 illustrates an example decentralized personal storage or identity hub.

FIG. 4 illustrates an embodiment of a computing system environment 400 in which a DID such as DID 205 is utilized. Specifically, the computing system environment 400 is used to describe the use of the DID 205 in relation to one or more decentralized stores or identity hubs 410 that are each under the control of the DID owner 201 to store data belonging to or regarding the DID owner 201. For instance, data is stored within the identity hubs using the storage module 380 of FIG. 3. It will be noted that FIG. 4 includes references to elements first discussed in relation to FIG. 2 or 3 and thus uses the same reference numeral for ease of explanation.

In one embodiment, the identity hubs 410 are multiple instances of the same identity hub. This is represented by the line 410A. Thus, the various identity hubs 410 include at least some of the same data and services. Accordingly, if a change is made to part of at least some of the data (and potentially any part of any of the data) in one of the identity hubs 410, the change is reflected in one or more of (and perhaps all of) the remaining identity hubs.

The identity hubs 410 may be any data store that is in the exclusive control of the DID owner 201. As an example only, the first identity hub 411 and second identity hub 412 are implemented in cloud storage (perhaps within the same cloud, or even on different clouds managed by different cloud providers) and thus are able to hold a large amount of data. Accordingly, a full set of the data is storable in these identity hubs.

However, the identity hubs 413 and 414 may have less memory space. Accordingly, in these identity hubs a descriptor of the data stored in the first and second identity hubs is included. Alternatively, a record of changes made to the data in other identity hubs is included. Thus, changes in one of the identity hubs 410 are either fully replicated in the other identity hubs or at least a record or descriptor of that data is recorded in the other identity hubs.

Because the identity hubs are multiple instances of the same identity hub, only a full description of the first identity hub 411 will be provided as this description also applies to the identity hubs 412 through 414. As illustrated, identity hub 411 includes data storage 420. The data storage 420 is used to store any type of data that is associated with the DID owner 201. In one embodiment the data is a collection 422 of a specific type of data corresponding to a specific protocol. For example, the collection 422 may be medical records data that corresponds to a specific protocol for medical data. The collection 422 also includes other types of data, such as credential information 215 made by or about the DID owner 201.

In one embodiment, the stored data has different authentication and privacy settings 421 associated with the stored data. For example, a first subset of the data has a setting 421 that allows the data to be publicly exposed, but that does not include any authentication to the DID owner 201. This type of data is typically for relatively unimportant data such as color schemes and the like. A second subset of the data has a setting 421 that allows the data to be publicly exposed and that includes authentication to the DID owner 201. A third subset of the data has a setting 421 that encrypts the subset of data with the private key 206 and public key 207 pair (or some other key pair) associated with the DID owner 201. This type of data will require a party to have access to the public key 207 (or to some other associated public key) in order to decrypt the data. This process also includes authentication to the DID owner 201. A fourth subset of the data has a setting 421 that restricts this data to a subset of third parties. This requires that public keys associated with the subset of third parties be used to decrypt the data. For example, the DID owner 201 causes the setting 421 to specify that only public keys associated with friends of the DID owner 201 are able to decrypt this data. With respect to data stored by the storage module 380, these settings 421 are at least partially composed by the storage module 380 of FIG. 3.

In some embodiments, the identity hub 411 has a permissions module 430 that allows the DID owner 201 to set specific authorization or permissions for third parties such as third parties 401 and 402 to access the identity hub. For example, the DID owner 201 provides access permission to his or her spouse to all the data stored in data storage 420. Alternatively, the DID owner 201 allows access to his or her doctor for any medical records. It will be appreciated that the DID owner 201 is able to give permission to any number of third parties to access a subset of the data stored in data storage 420. This will be explained in more detail to follow. With respect to data stored by the storage module 380, these access permissions 430 are at least partially composed by the storage module 380 of FIG. 3.

The identity hub 411 also include a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipsis 416 represents that the identity hub 411 may have additional services as circumstances warrant.

In one embodiment, the DID owner 201 wishes to authenticate a new user device 301 with the identity hub 411 that is already associated with the DID 205 in the manner previously described. Accordingly, the DID owner 201 utilizes the DID management module 320 associated with the new user device 301 to send a message to the identity hub 411 asserting that the new user device is associated with the DID 205 of the DID owner 201.

However, the identity hub 411 is not able to initially recognize the new device as being owned by the DID owner 201. Accordingly, the identity hub 411 uses the messaging module 440 to contact the DID resolver 450. The message sent to the DID resolver 450 includes the DID 205.

The DID resolver 450 is a service, application, or module that is configured in operation to search the distributed ledger 220 for DID documents associated with DIDs. Accordingly, in the embodiment the DID resolver 450 searches the distributed ledger 220 using the DID 205, which should result in the DID resolver 450 finding the DID document 210. The DID document 210 is then provided to the identity hub 411.

As discussed previously, the DID document 210 includes a public key 208 or 209 that is associated with the new user device 301. To verify that the new user device is owned by the DID owner 201, the identity hub 411 provides a cryptographic challenge to the new user device 301 using the messaging module 440. This cryptographic challenge is structured such that only a device having access to the private key 206 will be able to successfully answer the challenge.

In this embodiment, since the new user device is owned by DID owner 201 and thus has access to the private key 206, the challenge is successfully answered. The identity hub 411 then records in the permissions 430 that the new user device 301 is able to access the data and services of the identity hub 411 and also the rest of the identity hubs 410.

It will be noted that this process of authenticating the new user device 301 was performed without the need for the DID owner 201 to provide any username, password, or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 provides the DID 205 to the third-party 401 so that the third-party is able to access data or services stored on the identity hub 411. For example, the DID owner 201 is a human who is at a scientific conference who desires to allow the third-party 401, who is also a human, access to his or her research data. Accordingly, the DID owner 201 provides the DID 205 to the third-party 401.

Once the third-party 401 has access to the DID 205, he or she accesses the DID resolver 450 to access the DID document 210. As previously discussed, the DID document 210 includes a service end point 213 that is an address or pointer to services associated with the decentralized identity.

Completing the research data example, the third-party 401 sends a message to the messaging module 440 asking for permission to access the research data. The messaging module 440 sends a message to the DID owner 201 asking if the third-party 401 should be given access to the research data. Because the DID owner desires to provide access to this data, the DID owner 201 allows permission to the third-party 401 and this permission is recorded in the permissions 430.

The messaging module 440 then messages the third-party 401 informing the third-party that he or she is able to access the research data. The identity hub 411 and the third-party 401 directly communicate so that the third-party is able to access the data. It will be noted that in many cases, it will actually be an identity hub associated with the third-party 401 that communicates with the identity hub 411. However, it may be a device of the third-party 401 that does the communication.

Advantageously, the above described process allows the identity hub 411 and the third-party 401 to communicate and to share the data without the need for the third-party to access the identity hub 411 in the conventional manner. Rather, the communication is provisioned in the decentralized manner using the DID 205 and the DID document 210. This advantageously allows the DID owner to be in full control of the process.

As shown in FIG. 4, the third-party 402 also requests permission for access to the identity hub 411 using the DID 205 and the DID document 210. Accordingly, the embodiments disclosed herein allow access to any number of third parties to the identity hubs 410.

As briefly discussed above, the identity hub 411 is hosted in a cloud service. The service provider has access to the data stored in each user's identity hub 411. Furthermore, the service provider also has access to certain activities of the DID owner. For example, the entities with whom the DID owner has shared his/her data is stored in the identity hub 411. As another example, a user has multiple DIDs and has shared data amongst the multiple DIDs, alternatively, the user has used different DID management modules to access the same data. Based on the data sharing activities, the service provider of the identity hub 411 correlate the relationships of different DIDs and find out that two DIDs is related or owned by the same owner. Thus, the user's privacy is compromised.

The principles described herein will solve these potential privacy concerns of DID owners by encrypting the personal data stored in the identity hub 411. The encryption/decryption keys are not stored or accessible by the identity hub 411, so that the DID owners not only have great control over their data from other DID owners or users, but also have their privacy protected from the service providers.

There are many different objects stored in the identity hub 411. A data object is a file, a folder, or any portion of data stored in the identity hub 411. The whole identity hub 411 is encrypted with one encryption/decryption key as one object. Alternatively, a different portion of the data stored in the identity hub 411 is encrypted with different encryption/decryption keys.

In another example embodiment, verifiable claims (e.g., credential information 215) are issued and stored at the identity hub 411. For example, a verifiable claim that is associated with a DID owner 201 is issued by a claim issuing entity, and the issued verifiable claim is stored at the identity hub 411 that is associated with the DID owner 201. The DID owner 201 send the verifiable claim to another entity when the other entity requires to verify the credential of the DID owner. For example, the DID owner 201 is a person holding a driver's license, and the claim issuing entity is a DMV that has issued the DID owner's driver's license. The DMV issues a verifiable claim that verifies that the DID owner 201 is holding a valid driver's license. The DID owner 201 stores the verifiable claim in the identity hub 411. Another entity is a rental car company, which requires the DID owner 201 to show that he/she has a valid driver's license. The DID owner then sends the verifiable claim stored at the identity hub 411 to the rental car company.

Figure 5:
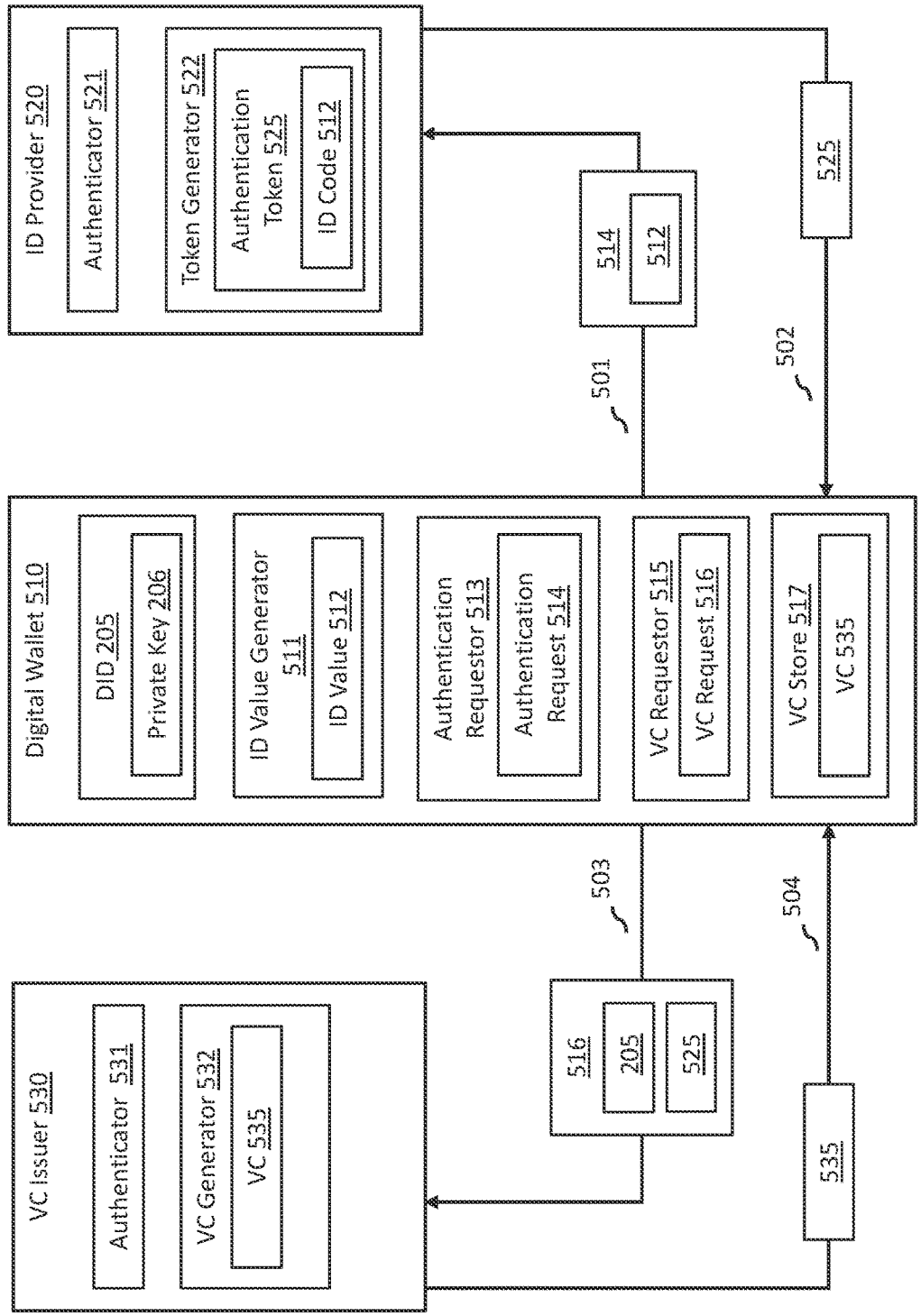
FIG. 5 illustrates an example computing environment, in which the principles described herein are implemented.

Having described DIDs and how they operate generally with reference to FIGS. 2-4, a specific embodiment of securing authentication flows using DIDs will now be explained with reference to FIG. 5. As illustrated in FIG. 5, a computing system environment 500 includes a digital wallet 510 that corresponds to the DID management module of FIG. 3. Thus, the digital wallet 510 is associated with the DID 205 and its associated private key 206 of the DID owner 201. The DID 205 and private key 206 may be generated in the manner previously discussed.

The computing system environment 500 also includes a Verifiable Claim (VC) issuer 530. The VC issuer 530 is an entity that is able to provide one or more verifiable claims 535 on behalf of the DID owner 201 who owns the digital wallet 510 and the DID 205. The VC issuer 530 may be any reasonable entity that provides information that is associated with the DID owner 201 such as the information discussed previously in relation to credential information 215.

The computing system environment 500 further includes an identification (ID) provider 520. In operation, the ID provider 520 manages authentication and/or identity services on behalf of the VC issuer 530 so that the VC issuer will know that a request for one or more verifiable claims 535 comes from the DID owner 201 of the digital wallet 510 and the DID 205. In other words, the ID provider 520 is a trusted source from the perspective of the VC issuer 530 and thus is able to provide a trusted verification of the identity (or at least the portion of the identity) of the DID owner 201 of the digital wallet 510 to the VC issuer 530. The ID provider 520 may implement one or more of IndieAuth protocol, OAuth 2.0 protocol, OpenID Connect protocol, or any other reasonable authentication protocol.

The DID owner 201 of the digital wallet 510 may desire to receive one or more verifiable claims 535 that can be associated with the DID 205 from the issuer 530 as will be described in more detail to follow. The digital wallet 510 may therefore send a request to the VC issuer 530 along with the DID 205 to request the one or more verifiable claims 535. The request will often include one or more authentication proofs generated by the ID 520 that verify the identify of the of the DID owner 201 of the digital wallet 510 to the VC issuer 530. However, the VC issuer 530 may have no way to determine if the authentication proofs included in the request for the verifiable claims 535 are actually for the DID 205 or if some other DID being used in a malicious manner. Accordingly, the embodiments disclosed herein provide a mechanism for the digital wallet 510 to provide authentication proofs generated by the ID provider 520 to the VC issuer 530 and to bind the authentication proofs to the DID 205 as will now be explained.

The digital wallet 510 also includes an ID value generator 511. In operation, the ID value generator 511 is configured to generate an ID value 512. In some embodiments, the ID value 512 is a randomized string or hash value. In one embodiment, the ID value generator 511 uses the private key 206 to generate the ID value 512. That is, the ID value generator 511 signs the ID value 512 using the private key 206. In another embodiment, the ID generator 511 is configured to generate a hash of the DID 205 as the ID value 512. In a further embodiment, the ID generator is configured to use the DID 205 as the generated ID value 512. In each of these embodiments, the generation of the ID value 512 associates the ID value with the DID 205, thus binding the ID value 512 to the DID 205.

The digital wallet 510 further includes an authentication requestor 513. In operation, the authentication requestor is configured to generate an authentication request 514. In one embodiment, the authentication request 514 is a JSON document that conforms to the protocol implemented by the ID provider 520. Of course, it will be appreciated that the authentication request 514 may be other than a JSON document as circumstances warrant. In the current embodiment, the ID value 512 is included in the authentication request 514.

Figure 6:
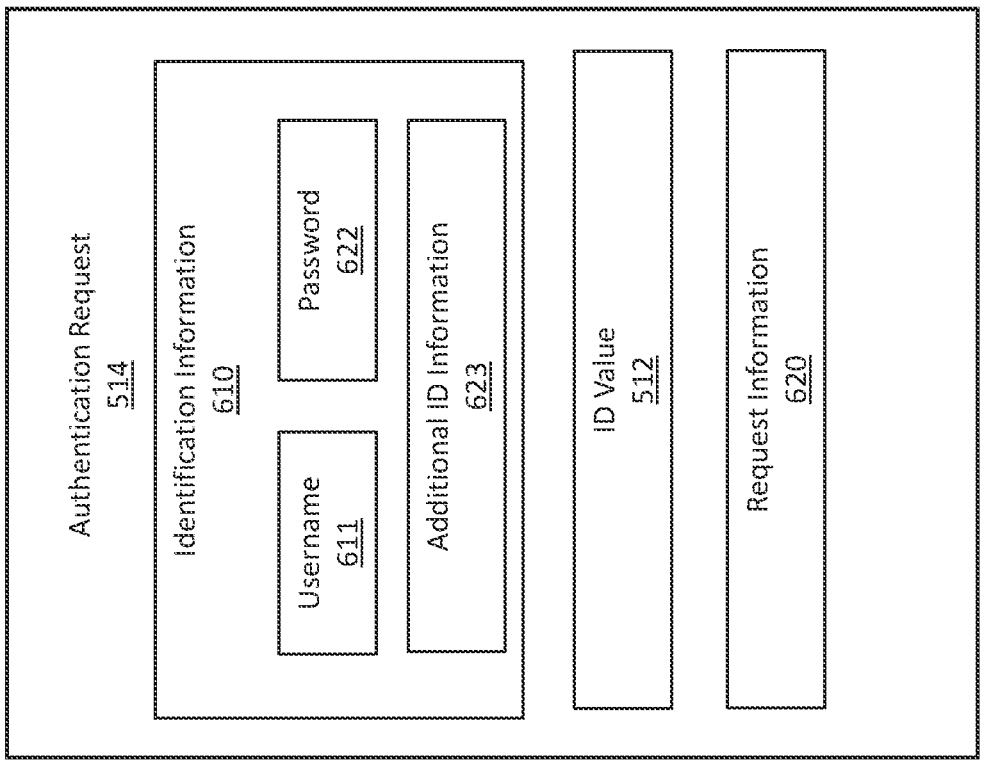
FIG. 6 illustrates an example authentication request.

FIG. 6 illustrates a specific embodiment of the authentication request 514. As illustrated, the authentication request 514 includes identification information 610. The identification information 610 may be any information that is needed or required by the ID provider 520 so that the ID provider is able to authenticate that the authentication request 600 is from a known or trusted source. For example, the identification information 610 may include a username 611 and a password 622 that can be used by the ID provider to validate the user who sent the authentication request is authorized to access the services of the VC issuer 530. The identification information 610 may also include additional ID information 623 as needed to further verify the identity of the requesting user. In the current embodiment, it is desirable that the identification information 610 only require the smallest amount of information possible to authenticate that the authentication request 600 is from a known or trusted source so that the control of personal information that is core to the use of a DID is maintained as much as possible.

The authentication request 514 also includes the ID value 512. As discussed previously, the ID value 512 is generated using the private key 506. The authentication request also includes request information 620. The request information 620 includes information that indicates that the digital wallet 510 wants to receive an authentication token from the ID provider 520.

As shown at 501 in FIG. 5, the digital wallet 510 provides the authentication request 514 to the ID provider 520. The ID provider 520 includes an authenticator 521. In operation, the authenticator 521 uses the identification information (i.e., identification information 610) included in the authentication request to authenticate or validate the user of the digital wallet 510 who provided the authentication request.

Upon a successful authentication or validation, a token generator 522 that is included in the ID provider 520 generates an authentication token 525 that can be presented to the VC issuer 530 for access to one or more verifiable claims 535 as will be explained. In the embodiment, the authentication token 525 includes the ID value 512 that was received as part of the authentication request 514. In one embodiment, the authentication token 525 may be a JSON document. It will be appreciated that the ID provider 520 will typically have no understanding of the ID value 512 and will not have the ability to interpret or otherwise validate the ID value 512. In other words, the ID provider 520 will not decrypt the ID value 512. Rather, the token generator 522 is configured to simply include the ID value 512 in the authentication token 525 for later use by the VC issuer 530.

Figure 7:
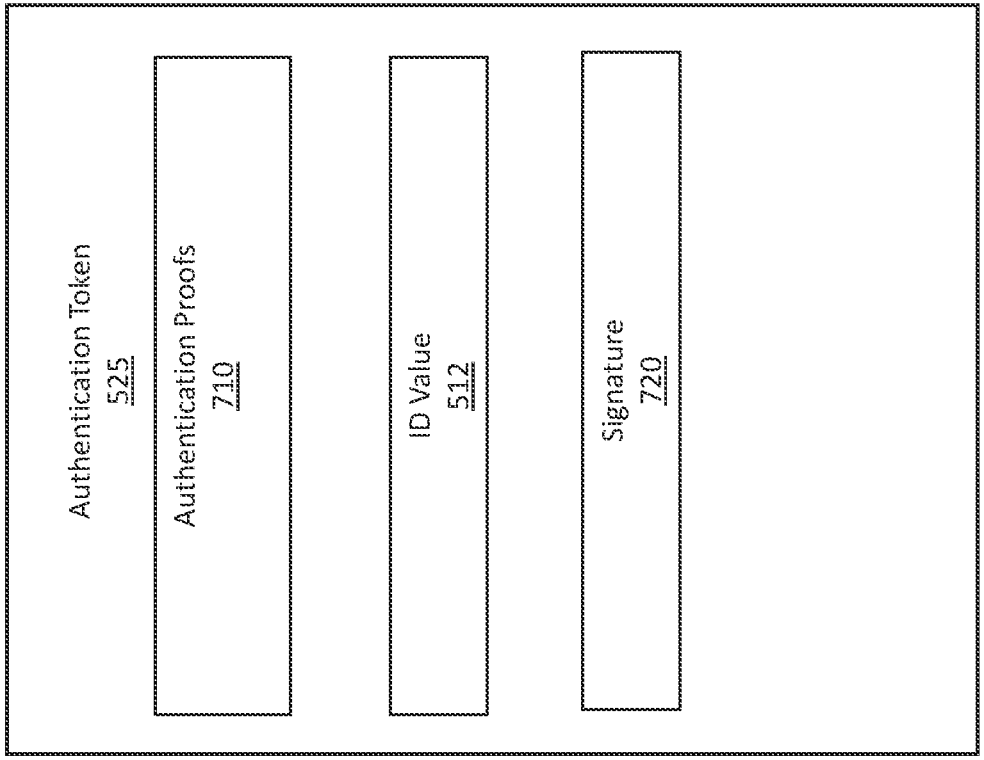
FIG. 7 illustrates an example authentication token.

FIG. 7 illustrates a specific embodiment of the authentication token 525. As illustrated, the authentication token 525 includes authentication proofs 710. The authentication proofs 710 include one or more claims issued by the ID provider 520 that verify that the DID owner 201 of the digital wallet 510 is a trusted party that should be given access to the services of the VC issuer 530. The type and format of the authentication proofs 710 may be dependent on the type of protocol of the ID provider 520.

The authentication token 525 also includes the ID value 512. As will be explained, the ID value 512 is used to ensure that a request for the one or more verifiable claims 535 is made by the same user as the user authenticated or validated by the ID provider 520, which in the embodiment is the DID owner 201. In some embodiments, the authentication token 525 also includes a signature 720. The signature 720 is typically a cryptographic mechanism (such as a digital signature) that is used to detect whether the authentication token has been tampered with since the time it was issued and can be used to validate that authentication token 525 was generated by the ID provider 520. Thus, in embodiments including the signature 720, the ID provider 520 would use a private key to generate the signature 720 and then the VC issuer 530 would use a corresponding public key to validate the signature. In other embodiments, the signature 720 may be omitted.

As shown at 502 in FIG. 5, the ID provider 520 provides the authentication token 525 to the digital wallet 510. The digital wallet 510 includes a VC requestor 515. In operation, the VC requestor 515 is configured to generate a VC request 516 that is a request to the VC issuer 530 for one or more verifiable claims 535 that are to be associated with the DID 205. The VC request may also include the DID 205 so that the VC issuer 530 knows which DID to associate the credentials with.

Figure 8:
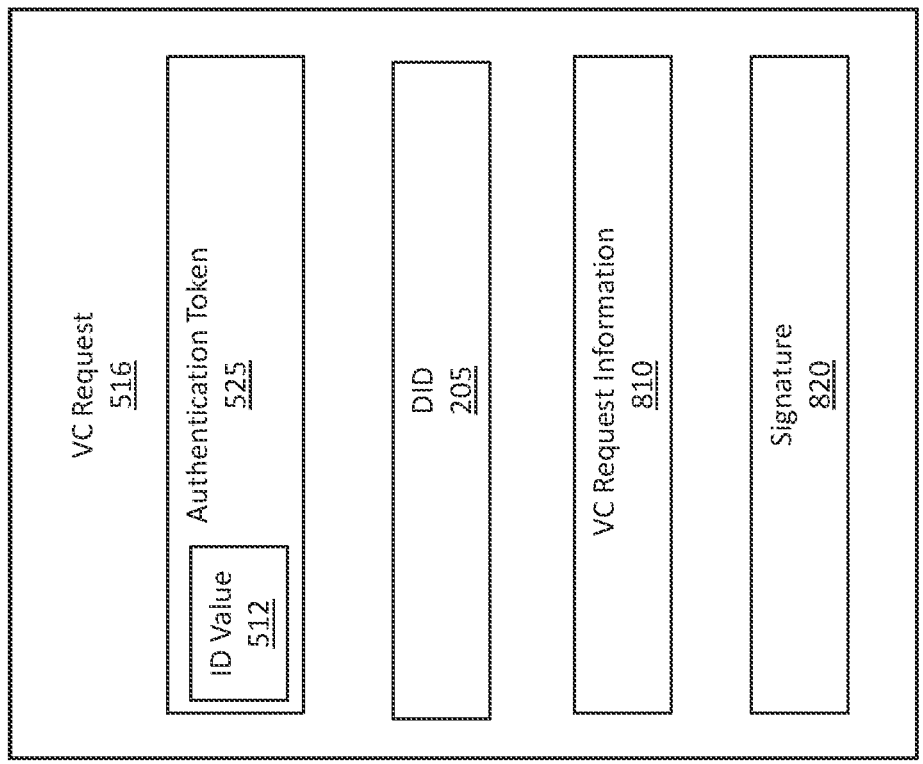
FIG. 8 illustrates an example verifiable claim request.

FIG. 8 illustrates a specific embodiment of the VC request 516. As illustrated, the VC request includes the authentication token 525 which has been generated to include the ID value 512 as previously described. The VC request may also include the DID 205 as also previously described.

The VC request 516 includes VC request information 810. The VC request information 810 is configured to specify the one or more verifiable claims 535 that are desired by the DID owner 201 of the digital wallet 510. For example, if the VC issuer 530 is a government entity such as the DMV, then the VC request information 810 may specify that verifiable claims related to a driver's license or driving history are desired. Alternatively, if the VC issuer 530 is an employer, then the VC request information 810 may specify that verifiable claims related to employment history are desired.

In some embodiments, the VC request 516 also includes a signature 820. The signature 820 is typically a cryptographic mechanism (such as a digital signature) that is generated using the private key 206 associated with the DID 205. As with the signature 720 discussed previously, the signature 820 can be used to detect if the VC request 516 has been tampered with and can also be used to verify that the VC request 516 has been generated by the digital wallet 510.

As shown at 503 in FIG. 5, the digital wallet 510 provides the VC request 516 to the VC issuer 530. The VC issuer 530 includes an authenticator 531. In operation, the authenticator 531 is configured to validate the signature 820. In some embodiments, the validation includes validating the signature 820 by use of the public key 207 associated with the DID 205. In addition, the authenticator 531 is configured to validate the authentication token 525 to ensure that the ID provider properly generated the token 525. In some embodiments, the validation includes validating the signature 720 by use of a public key associated with the ID provider 520.

In addition, the authenticator 531 is configured to validate the ID value 512 to ensure that the authentication token 525 is being provided by the DID owner 201 of the DID 205 using the digital wallet 510. As mentioned above, in one embodiment the ID value 512 is a randomized value or hash generated using the private key 206. In such embodiment, the authenticator 531 accesses the DID 205 from the VC request 516 and uses the DID to access the distributed ledger (i.e., distributed ledger 220) to obtain the public key 207 associated with DID 205 from the DID document 210 of the DID 205 in the manner previously described. In other embodiments, the VC issuer 530 may already have access to the DID 205 and thus does not need to access it from the VC request 516 when using the DID 205 to access the public key 207 from the distributed ledger. Alternatively, the VC issuer 530 may already have access to the public key 207 associated with the DID 205 from a prior interaction with the DID owner 201.

Once the public key 207 associated with the DID 205 has been accessed, the authenticator 531 uses the public key 207 to validate the ID value 512. For example, since the ID value 512 was generated using the private key 206 as previously discussed, the authenticator 531 is able to use the public key 207 to decrypt the ID value 512 to ascertain that the ID value 512 was signed by the same entity that signed the DID 205. In other words, the authenticator 531 determines if the DID 205 and the ID value 512 were both signed using the private key 206. If the authenticator 531 determines that the DID 205 and the ID value 512 were both signed using the private key 206, the authenticator 531 will validate the ID value 512 and allow the VC issuer 530 to issue the requested verifiable claims.

As also mentioned above, in one embodiment, the ID value 512 is a hash of the DID. In such embodiment, the authenticator 531 makes a comparison of a hash of the DID 205 with the hash of the DID that comprises ID 512. If the comparison shows that the hash of the DID that comprises the ID value 512 matches the hash of the DID 205 possessed or generated by the authenticator 531, the authenticator 531 will validate the ID value 512 and allow the VC issuer 530 to issue the requested verifiable claims.

Likewise, in the embodiment where the ID value is the DID 205, the authenticator 531 compares the DID 205 included in the VC request 516 with the DID that comprises the ID value 205. If the comparison shows that the DID 205 that comprises the ID value 512 matches the DID 205, the authenticator 531 will validate the ID value 512 and allow the VC issuer 530 to issue the requested verifiable claims. In both the embodiment where the hash of the DID is included in the VC request and in the embodiment where the DID itself is included in the VC request, since the authenticator 531 validates the signature 820 in the manner previously described, the VC issuer 530 has assurance that the DID 205 used to sign the signature 820 is the same DID that is hashed or that is included in the VC request and that the DID 205 is owned by the DID owner 201.

Of course, if the ID value 512 is not included in the VC request 516 or if the authenticator 531 fails to validate the ID value 512, then the VC issuer 530 will not issue the requested verifiable claims. Thus, the use of the ID value 512 ensures that the authentication proofs 710 included in the authentication token 525 are bound to the DID 205 so that no other DID can use the authentication proofs 710 to gain authorization to receive the requested verifiable claims.

Accordingly, if an entity other than the DID owner 201 has in some malicious manner highjacked the authentication token 525 and tries to associate this token with his or her own DID to thus receive the verifiable credentials from the VC issuer 530, the process will fail. That is, the DID of the malicious party and the ID value 512 will not have been signed by the same private key and thus the authenticator 531 will not authenticate the ID value 512. In such cases, the VC issuer 530 will not provide the requested verifiable claims.

In some embodiments, the DID owner 201 may try to use the authentication token 525 to receive verifiable claims for a second DID he or she owns such as DID 331. However, since the ID value 512 will have been used in relation to the DID 205 as explained, the authenticator 531 will reject the request since the ID value 512 can only be used in relation to the DID 205. Thus, the DID owner 201 is required to generate a new ID value for the DID 331 and then request a new authentication token that includes the new ID value to request the verifiable claims for the DID 331. This provides a further level of security as it prevents a malicious party from spoofing a DID owned by the DID owner 201 and using an existing authentication value on behalf of the spoofed DID.

As previously described, in some embodiments the VC request 516 may include the signature 820. In such embodiments, the authenticator 531 also uses the public key 207 to validate the signature 820. This provides a further level of security as if the signature 820 is not validated due to tampering with the VC request, the authenticator 531 can prevent the verifiable claims from being provided to the digital wallet 510.

The VC issuer 530 also includes a VC generator 532 that is configured to generate one or more verifiable claims 535 that are associated with the DID 205. The verifiable claims will be described in more detail in relation to FIGS. 9A and 9B.

Figure 9B:
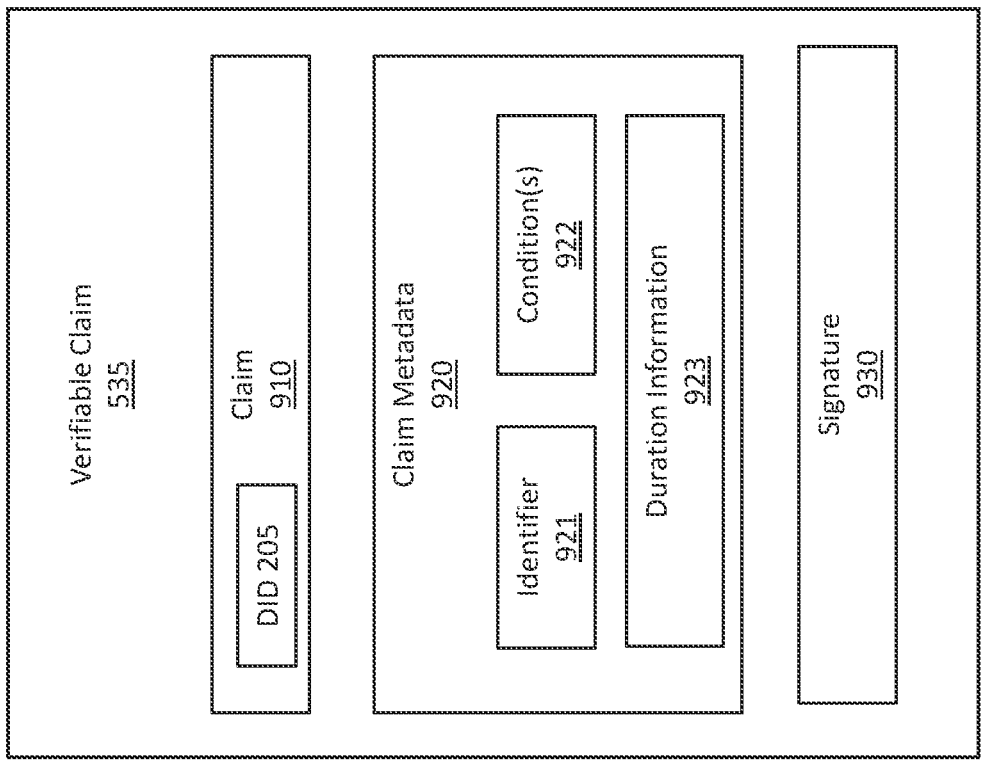
FIG. 9B illustrates an example verifiable claim.
Figure 9A:
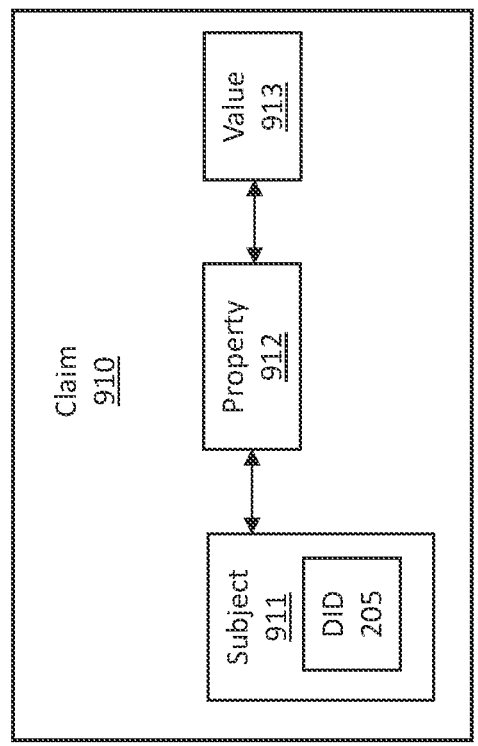
FIG. 9A illustrates an example claim.

FIG. 9A illustrates an example data structure that represents a claim 910. The claim 910 includes a subject 911, a property 912 and a value 913. For example, the subject 911 corresponds to the DID owner 201. The DID 205 is recorded as part of the subject 911. The property 912 may be any property of the DID owner 201, such as a name, a phone number, an email address, etc. The value 913 is the value of the corresponding property 912. For example, when the property is "name", the value would be the name of the owner of the DID, e.g., John Doe; when the property is "phone number", the value would be the phone number of the owner of the DID, e.g., 1-800-123-4567.

FIG. 9B illustrates an example data structure of a verifiable claim or credential 535. The verifiable claim includes the claim 910 of FIG. 9A and the DID 205. The verifiable claim 535 also includes a signature 930, which is generated by signing the verifiable claim 535 by a private key of the issuer, in this case the private key of the VC issuer 530. The signature 930 is typically a cryptographic mechanism (such as a digital signature) that is used to detect whether the verifiable claim 535 has been tampered with since the time that the verifiable claim was issued and can be used to verify the identity of the VC issuer 530.

Once the verifiable claim 535 is generated, at least a portion of data related to the verifiable claim 535 is propagated onto a distributed ledger (e.g., the distributed ledger 220), such that a relying entity can use the portion of data propagated onto the distributed ledger to verify the verifiable claim. In some embodiments, the public key corresponding to the private key of VC issuer 530 is also propagated onto the distributed ledger. In some embodiments, a hash of the public key or a hash of the verifiable claim or claim 535 is propagated onto the distributed ledger.

In some embodiments, the verifiable claim 535 also includes various metadata 920 related to the verifiable claim 535. For example, the metadata includes, but is not limited to, (1) a unique identifier 921 identifying the corresponding verified claim or credential, (2) one or more conditions 922 for accessing the verifiable claim or credential, or (3) duration information metadata 923 related to a duration of time that the VC issuer 530 wants the verifiable claim 535 to be valid for or useable for.

The one or more conditions metadata 922 for accessing the verifiable claim 535, include but are not limited to, (1) requiring the relying entity to pay a predetermined amount of cryptocurrency or type of currency, (2) requiring the relying entity to provide identification information, (3) requiring the relying entity to provide one or more verifiable claims, (4) requiring the relying entity to grant permission for accessing a portion of data, and/or (5) requiring the relying entity to provide a particular service.

The duration information metadata 923 includes, but is not limited to, (1) an expiration time of the corresponding verifiable claim 535, (2) a predetermined number of times that the corresponding verifiable claim 535 can be accessed or used, (3) a mechanism that automatically causes the verifiable claim 535 to expire in response to a directive from the VC issuer 530, or (4) a mechanism that allows the DID owner 201 to manually cause the verifiable claim 535 to expire.

As shown at 504, the VC issuer 504 provides the one or more verifiable claims 535 to the digital wallet 510 for the use of the DID owner 201. The one or more verifiable claims 535 may be stored in a VC store 517 that is part of the digital wallet 510. In addition to or alternatively, the one or more verifiable claims 535 may be stored in one or more of the ID hubs 411-414 or may be stored in both the VC store 517 and the one or more ID hubs 411-414.

The one or more verifiable claims 535 can subsequently be used by the DID owner 201 in interacting with third party entities that require the verifiable claims before providing a service to the DID owner. For example, if the VC issuer 530 is a government entity such as the DMV, then the one or more verifiable claims 535 may be related to a driver's license or driving history. At a subsequent time to receiving the one or more verifiable claims related to a driver's license or driving history, the DID owner 201 can present these verifiable claims to a car rental agency when renting a car. The car rental agency can use the verifiable claims to determine if the DID owner 201 has a valid driver's license and/or if he or she is a safe driver when determining whether to rent the car or not to the DID owner 201.

Figure 10:
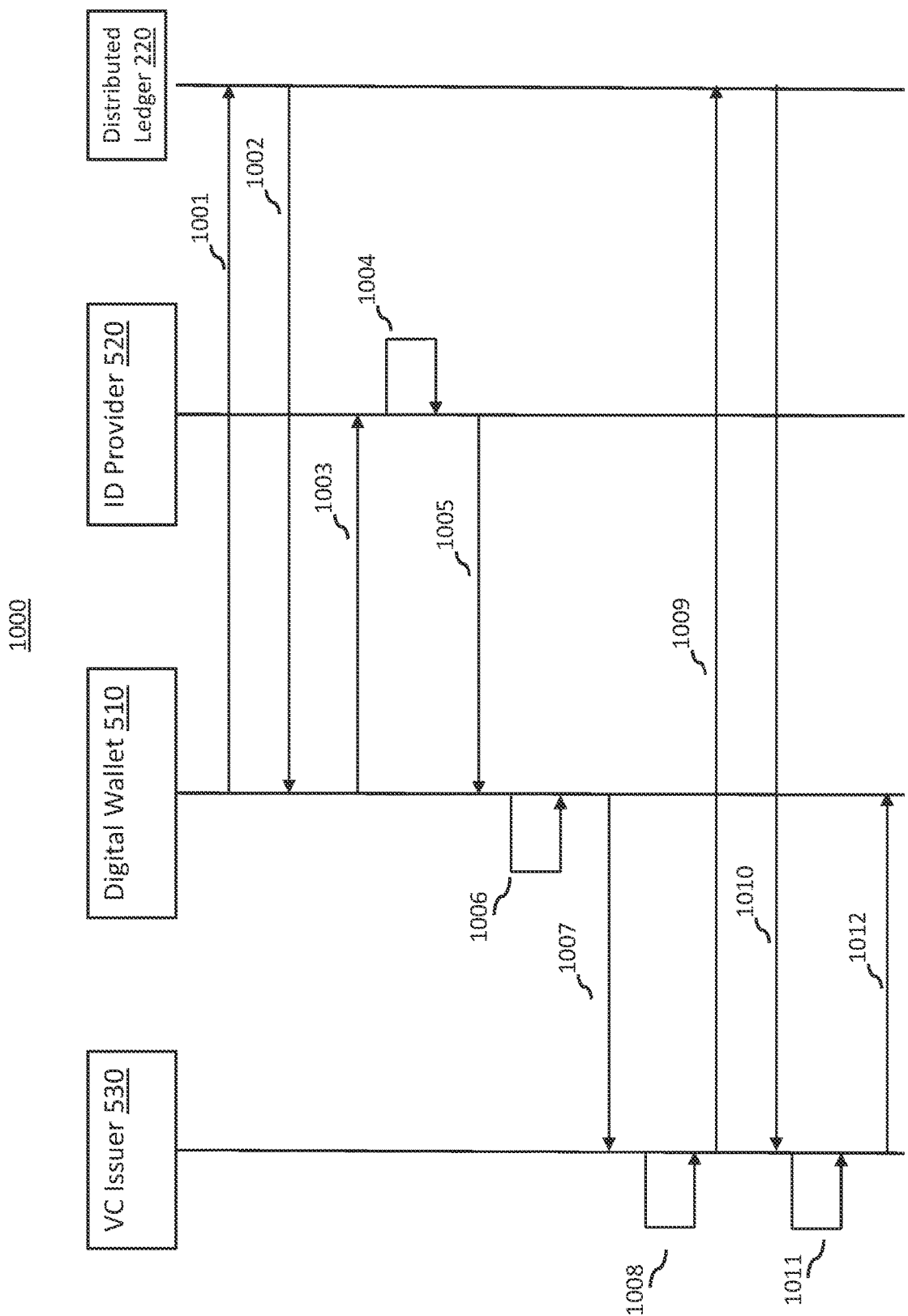
FIG. 10 illustrates a process flow of the computing environment of FIG. 5.

FIG. 10 illustrates a more detailed process flow 1000 for the interactions between the digital wallet 510, the ID provider 520 and the VC issuer 530 and their interactions with the distributed ledger 220. It will be appreciated that there are no temporal limitations to the process flow 1000 as some of the interactions may occur at a time earlier than a subsequent interaction and some of the interactions may occur one after the other in a short time frame.

As shown at interaction 1001, the digital wallet 510 accesses the distributed ledger 220 when generating the DID 205 using the private key 206 and records the DID document 210 or a pointer thereto onto the distributed ledger. Interaction 1002 represents that the DID 205 has been tied to the block chain and that the public key 207 is available for use by entities that are given access to the public key. Interactions 1001 and 1002 also represents that the digital wallet 510 has generated the ID value 512. In one embodiment, generating the ID value includes using the private key 206 so that the ID value 512 can be decrypted using the public key 207 that is accessible via the distributed ledger 220. In other embodiments, generating the ID value includes using a hash of the DID or the DID itself as the ID value.

During interaction 1003, the digital wallet 510 provides the authentication request 514 including the ID value 512 to the ID provider 520. During interaction 1004, the ID provider 520 validates the authentication request 514 and generates the authentication token 525 upon a successful validation. The ID provider returns the authentication token 525 including the ID value 512 to the digital wallet 510 during interaction 1005.

During interaction 1006, the digital wallet 510 generates the VC request 516 that includes the authentication token 525 and the ID value 512. The VC request 516 is sent to the VC issuer 530 during interaction 1007.

During interaction 1008, the VC issuer 530 validates the authentication token 525. In one embodiment, during interaction 1009, the VC issuer 530 accesses the distributed ledger 220 to thereby access the public key 207. Interaction 1010 represents that the public key 207 has been accessed by the VC issuer 530. In other embodiments, the interactions 1009 and 1010 may not be required.

During interaction 1011, the VC issuer 530 validates the ID value 512, which in one embodiment includes using the public key 207. Upon successful validation, the verifiable claims 535 are returned to the digital wallet 510 during interaction 1012.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
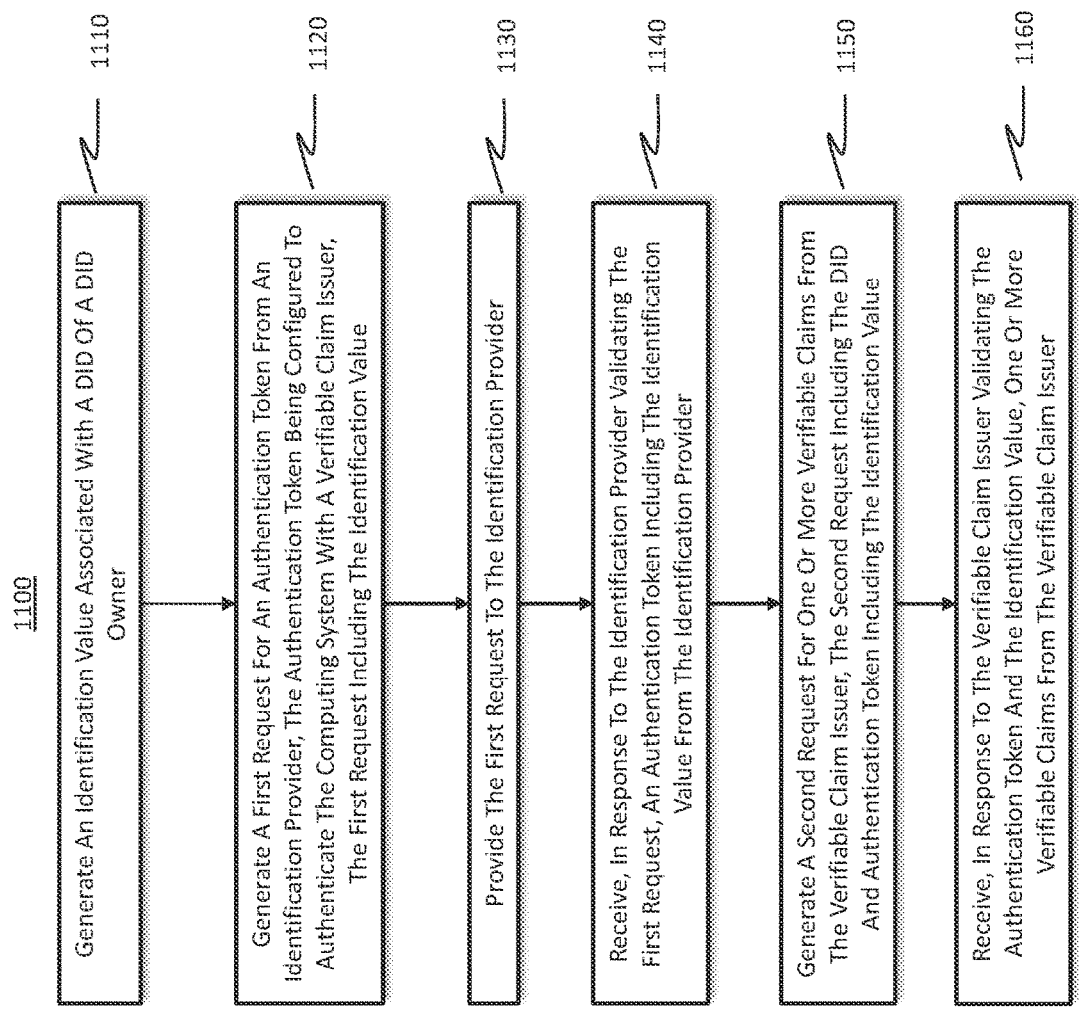
FIG. 11 illustrates a flow chart of an example method for a computing system of a digital wallet to receive an authentication token from an identity provider, the authentication token being used by the computing system in a request for one or more verifiable claims from a verifiable claim issuer so that the computing system can be validated by the verifiable claim issuer.

FIG. 11 illustrates a flow chart of an example method 1100 for a computing system of a digital wallet to receive an authentication token from an identity provider, the authentication token being used by the computing system in a request for one or more verifiable claims from a verifiable claim issuer so that the computing system can be validated by the verifiable claim issuer, the computing system being associated with a Decentralized Identifier (DID) that is backed by a distributed ledger. The method 1100 will be described with respect to one or more of FIGS. 2-10 discussed previously.

The method 1100 includes generating an identification value associated with a DID of a DID owner (1110). For example, as previously described the ID value generator 511 of the digital wallet 510 generates the ID value 512. In one embodiment, the ID value 512 is generated using the private key 206 that is associated with the DID 205 of the DID owner 201. The private key 206 has a corresponding public key 207 that is accessible via the distributed ledger 220. In such embodiment, the ID value 512 may be a cryptographic random number or hash that is signed by the private key 206. In another embodiment, the ID generator 511 is configured to generate a hash of the DID 205 as the ID value 512. In a further embodiment, the ID generator is configured to use the DID 205 as the generated ID value 512.

The method 1100 includes generating a first request for an authentication token from an identification provider, the authentication token being configured to authenticate the computing system with a verifiable claim issuer, the first request including the identification value (1120). For example, as previously described the authentication requestor 513 of the digital wallet generates the authentication request 514 to request an authentication token 525 from the ID provider 520. The authentication request 514 includes the ID value 512. In some embodiments, the authentication request also includes identification information such as a username and password and request information that requests the authentication token.

The method 1100 includes providing the first request to the identification provider (1130). For example, as previously described the digital wallet 510 provides the authentication request 514 to the ID provider 520.

The method 1100 includes receiving, in response to the identification provider validating the first request, an authentication token including the identification value from the identification provider (1140). For example, as previously described the ID provider 520 may validate the authentication request 514. Upon a successful validation, the ID provider 520 generates the authentication token 525 and includes the ID value 512 in the token. The authentication token is then received by the digital wallet 510.

The method 1100 includes generating a second request for one or more verifiable claims from the verifiable claim issuer, the second request including the DID and authentication token including the identification value (1150). For example, as previously described the VC requestor 515 of the digital wallet 510 generates the VC request 516. The VC request 516 includes the authentication token 525 and the ID value 512. In some embodiments, the VC request 516 may also include request information that specifies the desired verifiable claims and a cryptographic signature that is used for validating the VC request.

The method 1100 includes receiving, in response to the verifiable claim issuer validating the authentication token and the identification value, one or more verifiable claims from the verifiable claim issuer (1160). For example, as previously described the VC issuer 530 validates the authentication token 525 and then validates the ID value 512 using the public key 207 that is accessed via the distributed ledger 220. Upon a successful validation, the VC issuer 530 generates the one or more verifiable claims 535, which are then received by the digital wallet 510 and stored in one or both of the VC store 517 and the identity hubs 411-414 for future use.

Figure 12:
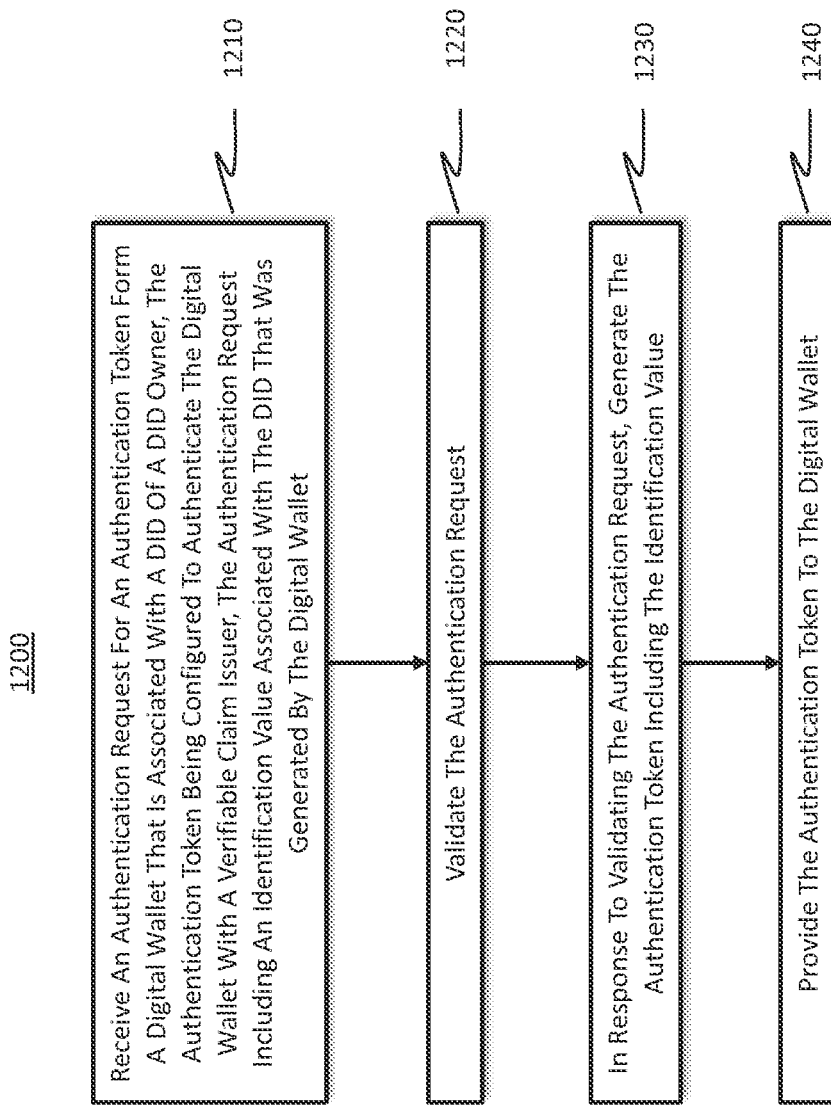
FIG. 12 illustrates a flow chart of an example method for a computing system of an identity provider to generate an authentication token for use by a digital wallet in a request for one or more verifiable claims from a verifiable claim issuer so that the digital wallet can be validated by the verifiable claim issuer.

FIG. 12 illustrates a flow chart of an example method 1200 for a computing system of an identity provider to generate an authentication token for use by a digital wallet in a request for one or more verifiable claims from a verifiable claim issuer so that the digital wallet can be validated by the verifiable claim issuer, the digital wallet being associated with a Decentralized Identifier (DID) that is backed by a distributed ledger. The method 1200 will be described with respect to one or more of FIGS. 2-10 discussed previously.

The method 1200 includes receiving an authentication request for an authentication token from a digital wallet that is associated with a DID of a DID owner, the authentication token being configured to authenticate the digital wallet with a verifiable claim issuer, the authentication request including an identification value that is associated with the DID of a DID owner that was generated by the digital wallet (1210). For example, as previously described the ID provider 520 receives the authentication request 514 from the digital wallet 510. The authentication request includes the ID value 512 and requests that the authentication token 525 be generated so that the digital wallet can be authenticated by the VC issuer 530.

The method 1200 includes validating the authentication request (1220). For example, as previously described the authenticator 521 of the ID provider 520 validates the authentication request 514.

The method 1200 includes, in response to validating the authentication request, generating the authentication token including the identification value (1230). For example, as previously described upon a successful validation of the authentication request, the token generator 522 of the ID provider 520 generates the authentication token 525 that includes the ID value 512.

The method 1200 includes providing the authentication token to the digital wallet (1240). For example, as previously described the ID provider 520 provides the authentication token 525 including the ID value 512 to the digital wallet 510.

Figure 13:
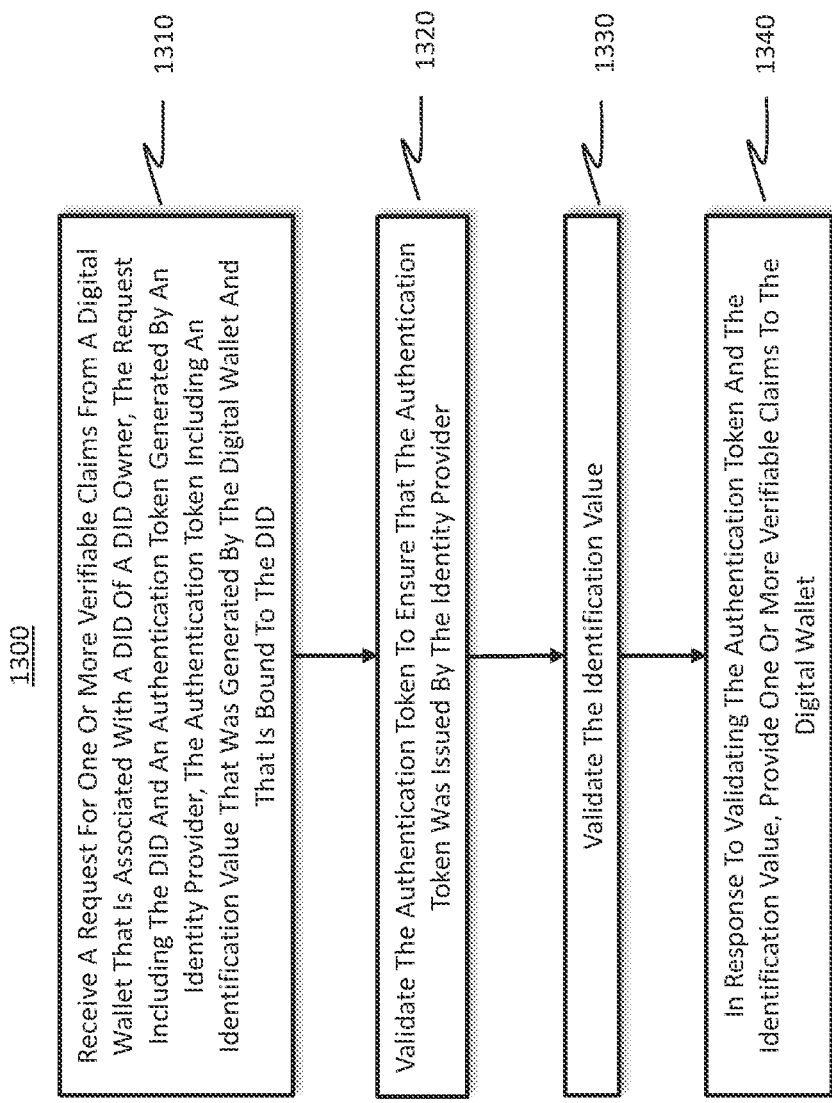
FIG. 13 illustrates a flow chart of an example method for a computing system of a verifiable claim issuer to provide one or more verifiable claims to a digital wallet, the computing system receiving an authentication token issued by an identity provider that validates that the digital wallet is authorized to receive the one or more verifiable claims.

FIG. 13 illustrates a flow chart of an example method 1300 for a computing system of a verifiable claim issuer to provide one or more verifiable claims to a digital wallet, the computing system receiving an authentication token issued by an identity provider that validates that the digital wallet is authorized to receive the one or more verifiable claims, the digital wallet being associated with a Decentralized Identifier (DID) that is backed by a distributed ledger. The method 1300 will be described with respect to one or more of FIGS. 2-10 discussed previously.

Method 1300 includes receiving a request for one or more verifiable claims from a digital wallet that is associated with a DID of a DID owner, the request including the DID and an authentication token generated by an identity provider, the authentication token including an identification value that was generated by the digital wallet and that is bound to the DID (1310). For example, as previously described the VC issuer 530 receives the VC request 516 from the digital wallet 510 that is associated with the DID 205 of the DID owner 201. The VC request 516 includes the authentication token 525 that includes the DID 205 and the ID value 512 generated by the digital wallet 510. The VC request 516 also specifies which verifiable claims the DID owner 201 desires to receive from the VC issuer.

The method 1300 includes validating the authentication token to ensure that the authentication token was issued by the identity provider (1320). For example, as previously described, the authenticator 531 of the VC issuer 530 validates the authentication token 525.

The method 1300 includes validating the identification value (1330). For example, as previously described the authenticator 531 of the VC issuer 530 validates the ID value 512. In one embodiment, the authenticator 531 uses the public key 207 to validate the ID value 512. In such embodiment, since the ID value 512 was generated and signed using the private key 206, the public key 207 is able to decrypt the ID value. In another embodiment, the authenticator 531 makes a comparison of a hash of the DID 205 with the hash of the DID that comprises ID 512. If the comparison shows that the hash of the DID that comprises the ID value 512 matches the hash of the DID 205 possessed or generated by the authenticator 531. In a further embodiment, the authenticator 531 compares the DID 205 included in the VC request 516 with the DID that comprises the ID value 205. If the comparison shows that the DID 205 that comprises the ID value 512 matches the DID 205, the authenticator 531 will validate the ID value 512 and allow the VC issuer 530 to issue the requested verifiable claims. If the ID value 512 is not present or if the ID value is an ID value that is different from the ID value 512, then the validation will fail.

The method 1300 includes, in response to validating the authentication token and the identification value, providing one or more verifiable claims to the digital wallet (1340). For example, as previously described upon a successful validation of the authentication token 525 and the ID value 512, the VC generator 532 of the VC issuer 530 generates the one or more verifiable claims 535 according to verifiable claims requested in the VC request 516. The VC issuer 530 then provides the one or more verifiable claims 535 to digital wallet 510.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system of a digital wallet for receiving an authentication token from an identity provider, the authentication token being used by the computing system in a request for one or more verifiable claims from a verifiable claim issuer so that the computing system can be validated by the verifiable claim issuer, the computing system being associated with a Decentralized Identifier (DID) that is backed by a distributed ledger, the computing system comprising:
   one or more processors; and
   one or more computer-readable storage media having thereon computer-executable instructions that are structured such that, when executed by the one or more processors, cause the computing system to:
   generate an identification value associated with a DID of a DID owner;
   generate a first request for an authentication token from an identification provider, the authentication token being configured to authenticate the computing system with a verifiable claim issuer, the first request including the identification value;
   provide the first request to the identification provider;
   receive, in response to the identification provider validating the first request, the authentication token including the identification value from the identification provider;
   generate a second request for one or more verifiable claims from the verifiable claim issuer, the second request including the DID and authentication token including the identification value; and
   receive, in response to the verifiable claim issuer validating the authentication token and the identification value, the one or more verifiable claims from the verifiable claim issuer.

2. The computing system of claim 1, wherein the identification value is a random number or hash value that is signed using a private key associated with the DID, the private key having an associated public key that is accessible via a distributed ledger.

3. The computing system of claim 2, wherein the associated public key is accessible by accessing a DID document associated with the DID that is tied to the distributed ledger.

4. The computing system of claim 1, wherein the identification value is a hash of the DID.

5. The computing system of claim 1, wherein the identification value comprises the DID.

6. The computing system of claim 1, wherein the first request includes identification information related to the DID owner and information requesting the authentication token.

7. The computing system of claim 1, wherein the authentication token includes one or more authentication proofs that are generated by the identity provider.

8. The computing system of claim 1, wherein the authentication token is cryptographically signed by the identity provider.

9. The computing system of claim 1, wherein the second request includes information specifying one or more verifiable claims that the DID owner desires to receive from the verifiable claim issuer.

10. The computing system of claim 1, wherein the second request is cryptographically signed using the private key that was used to generate the identification value.

11. The computing system of claim 1, wherein the one or more verifiable claims received from the verifiable claim issuer are stored at the computing system and/or stored at an identity hub owned by the DID owner.

12. A computing system of an identity provider for generating an authentication token for use by a digital wallet in a request for one or more verifiable claims from a verifiable claim issuer so that the digital wallet can be validated by the verifiable claim issuer, the digital wallet being associated with a Decentralized Identifier (DID) that is backed by a distributed ledger, the computing system comprising:
   one or more processors; and
   one or more computer-readable storage media having thereon computer-executable instructions that are structured such that, when executed by the one or more processors, cause the computing system to:
   receive an authentication request for an authentication token from a digital wallet that is associated with a DID of a DID owner, the authentication token being configured to authenticate the digital wallet with a verifiable claim issuer, the authentication request including an identification value associated with the DID that was generated by the digital wallet;
   validate the authentication request;
   in response to validating the authentication request, generate the authentication token including the identification value; and
   provide the authentication token to the digital wallet.

13. The computing system of claim 12, wherein the authentication request includes identification information related to the DID owner and information requesting the authentication token.

14. The computing system of claim 12, wherein the authentication token includes one or more authentication proofs that are generated by the computing system.

15. The computing system of claim 12, wherein the authentication token is cryptographically signed by the computing system.

16. The computing system of claim 12, wherein the computing system includes the identification value with the authentication token without decrypting the identification value.

17. A computing system of a verifiable claim issuer for providing one or more verifiable claims to a digital wallet, the computing system receiving an authentication token issued by an identity provider that validates that the digital wallet is authorized to receive the one or more verifiable claims, the digital wallet being associated with a Decentralized Identifier (DID) that is backed by a distributed ledger, the computing system comprising:
  one or more processors; and
  one or more computer-readable storage media having thereon computer-executable instructions that are structured such that, when executed by the one or more processors, cause the computing system to:
  receive a request for one or more verifiable claims from a digital wallet that is associated with a DID of a DID owner, the request including the DID and an authentication token generated by an identity provider, the authentication token including an identification value that was generated by the digital wallet and that is bound to the DID;
  validate the authentication token to ensure that the authentication token was issued by the identity provider;
  validate the identification value; and
  in response to validating the authentication token and the identification value, provide the one or more verifiable claims to the digital wallet.

18. The computing system of claim 17, wherein the identification value is a random number or hash value that is signed using a private key associated with the DID, wherein validating the identification token comprises using a public key that is associated with the private key and this is accessible via a distributed ledger.

19. The computing system of claim 17, wherein the identification value is a hash of the DID, wherein validating the identification value comprises determining that the hash of the DID comprising the ID value matches a hash of the DID.

20. The computing system of claim 17, wherein the identification value is a the DID, wherein validating the identification value comprises determining that the DID comprising the ID value matches the DID.

* * * * *